(12) United States Patent
Okada et al.

(10) Patent No.: US 12,013,610 B2
(45) Date of Patent: *Jun. 18, 2024

(54) LIGHT EMITTING DEVICE AND ILLUMINATION DEVICE

(71) Applicant: Japan Display Inc., Tokyo (JP)

(72) Inventors: Masafumi Okada, Tokyo (JP); Nobuyuki Suzuki, Tokyo (JP); Makoto Hasegawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/307,059

(22) Filed: Apr. 26, 2023

(65) Prior Publication Data

US 2023/0266619 A1    Aug. 24, 2023

Related U.S. Application Data

(63) Continuation of application No. 17/829,425, filed on Jun. 1, 2022, now Pat. No. 11,668,976, which is a continuation of application No. 17/220,503, filed on Apr. 1, 2021, now Pat. No. 11,378,841.

(30) Foreign Application Priority Data

Apr. 3, 2020 (JP) ................................. 2020-067778

(51) Int. Cl.
*G02F 1/13357* (2006.01)
*G02F 1/1335* (2006.01)

(52) U.S. Cl.
CPC .. *G02F 1/133603* (2013.01); *G02F 1/133526* (2013.01); *G02F 1/133607* (2021.01)

(58) Field of Classification Search
CPC ............ G02B 1/133607; G02B 6/0038; G02B 6/0036; G02B 6/0016; G02B 6/0018; G02B 6/0053; G02B 6/0056; G02B 6/0073

See application file for complete search history.

(56) References Cited

U.S. PATENT DOCUMENTS

| | | | | |
|---|---|---|---|---|
| 11,378,841 B2 * | 7/2022 | Okada | ............... | G02F 1/133526 |
| 2009/0316072 A1 * | 12/2009 | Okumura | ............. | G02B 5/0268 |
| | | | | 362/628 |
| 2012/0127397 A1 | 5/2012 | Yamamoto et al. | | |
| 2012/0201045 A1 * | 8/2012 | Gotou | .................. | G02B 6/0038 |
| | | | | 362/621 |

\* cited by examiner

*Primary Examiner* — Omar Rojas Cadima
(74) *Attorney, Agent, or Firm* — Michael Best & Friedrich LLP

(57) ABSTRACT

According to one embodiment, a light emitting device includes a light guide plate with a plurality of first protrusion parts arranged along a first direction and extending along a second direction which crosses the first direction, and a prism sheet, wherein a cross-sectional shape of each of the first protrusion parts along the first direction has an apex angle between 55 degrees and 65 degrees, inclusive, the light guide plate includes a plurality of second protrusion parts which extend along the first direction and are arranged along the second direction, and a cross-sectional shape of each of the second protrusion parts along the second direction has a base angle between 1 degree and 3 degrees, inclusive.

6 Claims, 16 Drawing Sheets

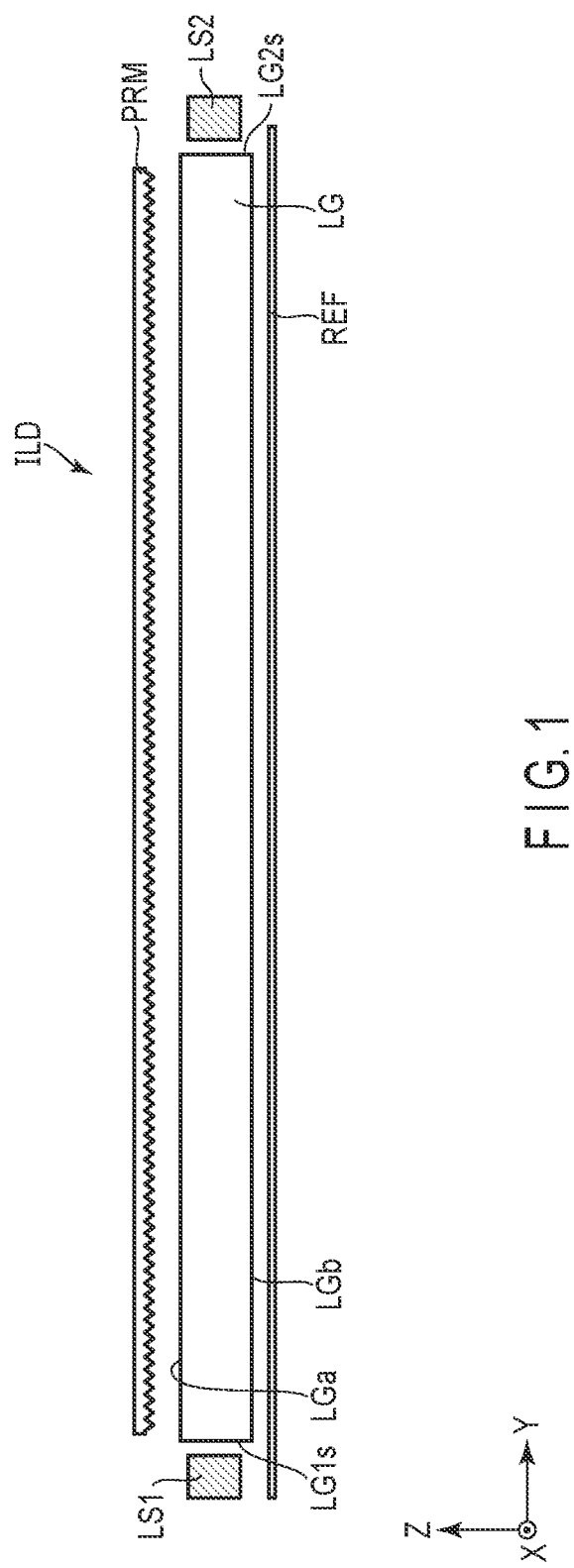
F I G. 1

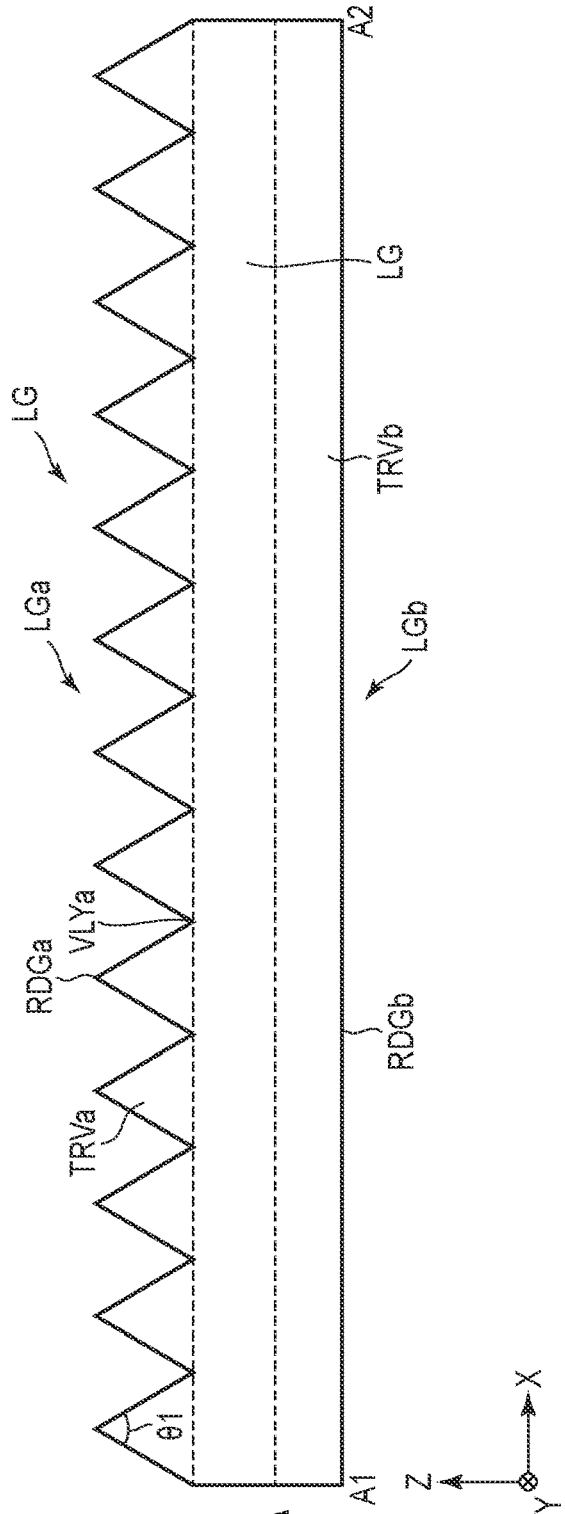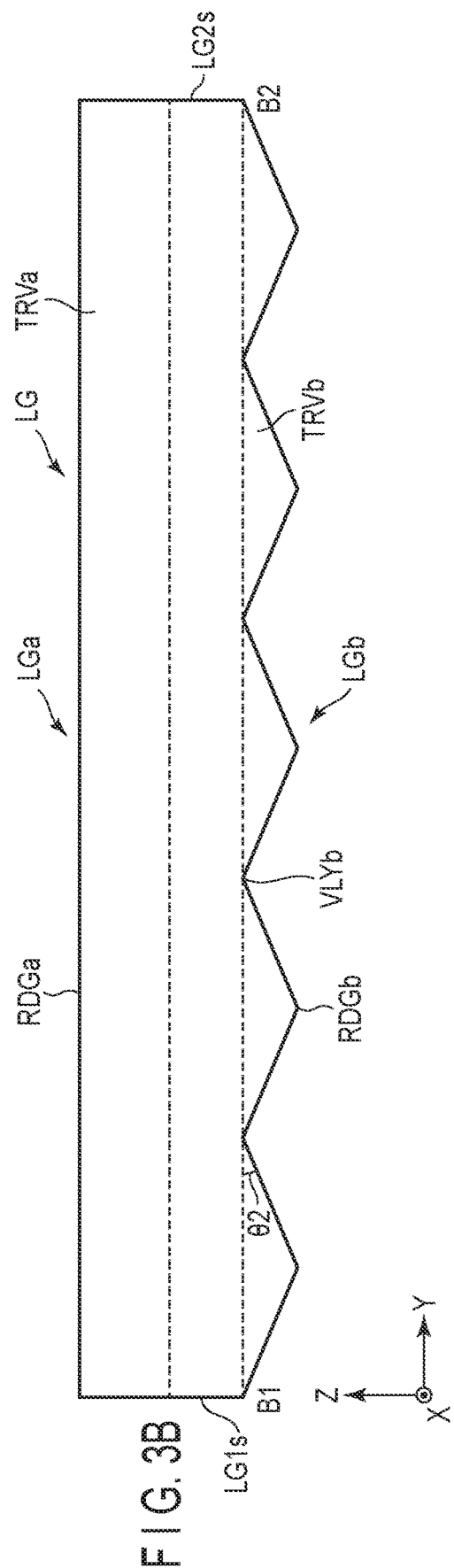
FIG. 3A
FIG. 3B

LIGHT EMITTING DEVICE AND ILLUMINATION DEVICE

CROSS-REFERENCE TO RELATED APPLICATIONS

This application is a continuation of U.S. application Ser. No. 17/829,425, filed on Jun. 1, 2022, which, in turn, is a continuation of U.S. application Ser. No. 17/220,503 (now U.S. Pat. No. 11,378,841), filed on Apr. 1, 2021. Further, this application is based upon and claims the benefit of priority from Japanese Patent Application No. 2020-067778, filed, Apr. 3, 2020, the entire contents of which are incorporated herein by reference.

FIELD

Embodiments described herein relate generally to a light emitting device and an illumination device.

BACKGROUND

Light emitting devices with a planar light emission function have been developed.

A light emitting device which includes a light source disposed in a side surface of a light guide plate such that light is emitted from a main surface disposed at a certain angle with respect to the side surface is used as a surface light source. For example, such a light emitting device is used as a backlight of a liquid crystal display device.

In order to suppress a change in luminosity by an observation angle of a liquid crystal display device, the light emitting device for the backlight of the display device is required to have a wider light emission angle.

BRIEF DESCRIPTION OF THE DRAWINGS

FIG. 1 is a cross-sectional view of the structure of a display device of an embodiment.

FIG. 3A illustrates a cross-sectional shape of a light guide plate.

FIG. 3B illustrates a cross-sectional shape of the light guide plate.

DETAILED DESCRIPTION

Figure 2A:
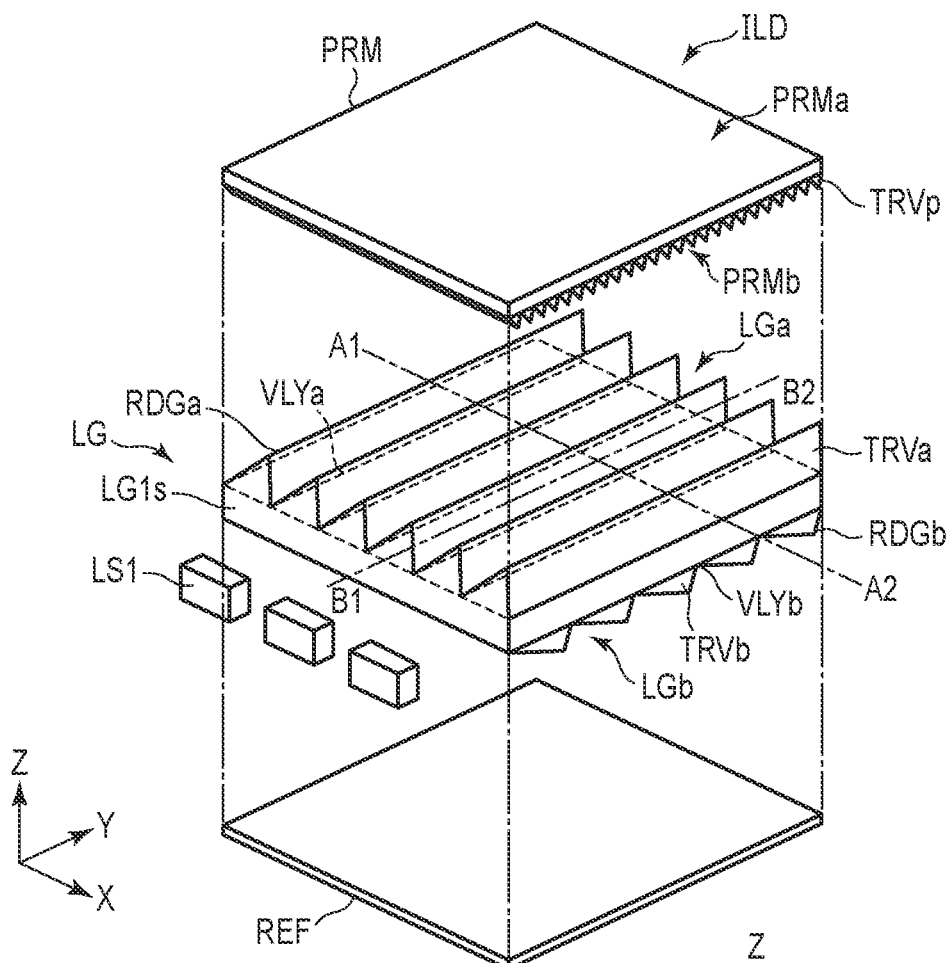
FIG. 2A is a perspective view of the structure of a light emitting device in a disassembled manner.

In general, according to one embodiment, a light emitting device includes: a light guide plate with a first main surface on which a plurality of first protrusion parts arranged along a first direction and extending along a second direction which crosses the first direction; a plurality of light source elements disposed on a side surface of the light guide plate to be adjacent to each other; and a prism sheet disposed to be opposed to the first main surface, wherein an emission surface of the light source element is disposed in the second direction, and a cross-sectional shape of each of the first protrusion parts along the first direction has an apex angle between 55 degrees) (55° and 65 degrees (65°), inclusive (in a range of larger than and equal to 55 degrees (55°), and smaller than and equal to 65 degrees) (65°)), and the light guide plate includes a plurality of second protrusion parts on a second main surface, which extend along the first direction and are arranged along the second direction, and a cross-sectional shape of each of the second protrusion parts along the second direction has a base angle between 1 degree (1°) and 3 degrees (3°), inclusive.

According to an embodiment, a light emitting device which can emit collimated light can be presented.

Embodiments will be described hereinafter with reference to the accompanying drawings. The disclosure is merely an example, and proper changes within the spirit of the invention, which are easily conceivable by a skilled person, are included in the scope of the invention. In some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. In the specification and drawings, the same elements as those described in connection with preceding drawings are denoted by like reference numerals, and a detailed description thereof may be omitted.

Hereinafter, an light emitting device of an embodiment will be explained with reference to the accompanying drawings.

In the embodiment, a first direction X, second direction Y, and third direction Z cross each other. The first direction X, second direction Y, and third direction Z may be orthogonal to each other, or may cross each other at an angle other than 90 degrees) (90°). A direction toward the tip of arrow of the third direction Z will be defined as up or above, and a direction opposite to the direction toward the tip of arrow of the third direction Z will be defined as low or below.

Furthermore, phrases such as "a second member above a first member" and "a second member below a first member" may be interpreted as the second member contacting the first member or as the second member apart from the first member. In the latter case, a third member may be interposed between the first member and the second member. On the other hand, phrases such as "a second member on a first member" and "a second member under a first member" will be interpreted as the second member contacting the first member.

Furthermore, a hypothetic observation position to observe a display device DSP is set in the tip side of arrow of the third direction Z, and seeing an X-Y plan view defined by the first direction X and the second direction Y from this observation position will be referred to as plan view. Seeing a cross-sectional view of the display device DSP along an X-Z plan view defined by the first direction X and the third direction Z, or along a Y-Z plan view defined by the second direction Y and the third direction Z will be referred to as cross-sectional view.

Embodiment

FIG. 1 is a cross-sectional view of the structure of the display device of the embodiment. A light emitting device ILD of FIG. 1 includes, along the third direction Z, a reflection sheet REF, light guide plate LG, and prism sheet PRM. Furthermore, the light emitting device ILD includes a light source element LS1 disposed to be adjacent to a side surface LG1s of the light guide plate LG.

The light guide plate LG includes a first main surface LGa (or main surface LGa) opposed to the prism sheet PRM and a second main surface LGb (main surface LGb) opposed to the reflection sheet REF. The main surface LGa is positioned above the main surface LGb, and is an emission surface of the light guide plate. Furthermore, the main surface LGb is opposed to the main surface LGa and is disposed in the opposite side thereof. On the main surface LGa and the main surface LGb, triangular prism shaped first protrusion parts and second protrusion parts are disposed. The protrusions parts will be explained later.

In the example of FIG. 1, a light source element LS1 is disposed to be adjacent to a first side surface LG1s of the light guide plate LG, and a light source element LS2 is disposed to be adjacent to a second side surface LG2s opposite to the first side surface LG1s. Note that, in FIG. 1, one light source element LS1 and one light source element LS2 are shown; however, there may be multiple light source elements LS1 and multiple light source elements LS2. Furthermore, instead of the light source elements LS1 and LS2, light source elements LS1 alone or light source elements LS2 alone may be disposed.

Furthermore, in the present embodiment, if there is no need of distinguishing the light source element LS1 from the light source element LS2, they may be referred to as a light source element LS. Furthermore, if there is no need of distinguishing the first side surface LG1s from the second side surface LG2s, they may be referred to as a side surface.

Light emitted from the light source element LS1 is, along the second direction Y, incident on the light guide plate LG through the side surface LG1s of the light guide plate LG. The light emitted from the light source element LS2 is, along the opposite direction of the second direction Y, incident on the light guide plate LG through the side surface LG2s of the light guide plate LG. The side surface LG1s of the light guide plate LG is a light incident surface, and the side surface G2s is a light incident surface of the light source element LS1. The surface of the light source element LS1 which is opposed to the side surface LG1s of the light guide plate LG in the second direction Y is an emission surface of the light source element LS1. Furthermore, the surface of the light source element LS2 which is opposed to the side surface LG2s of the light guide plate LG in the second direction Y is an emission surface of the light source element LS2. The light incident on the light guide plate LG propagates in the light guide plate LG to be emitted above. At that time, the light emitted from the light guide plate LG is incident on the prism sheet PRM with multiple inclined angles. The light incident on the prism sheet PRM is emitted by the prism sheet PRM in a direction parallel to the third direction Z. As described above, the light emitting device ILD can emits collimated light in which light beams are all parallel to the third direction Z.

Figure 2C:
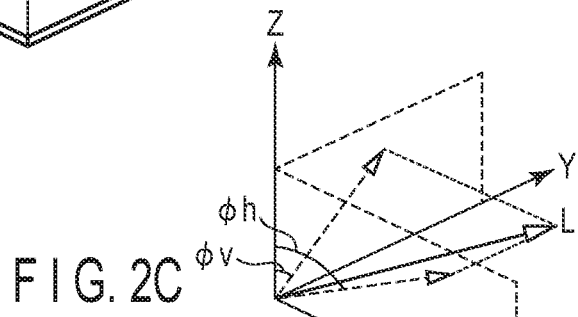
FIG. 2C is a perspective view of the structure of the light emitting device in a disassembled manner.
Figure 2B:
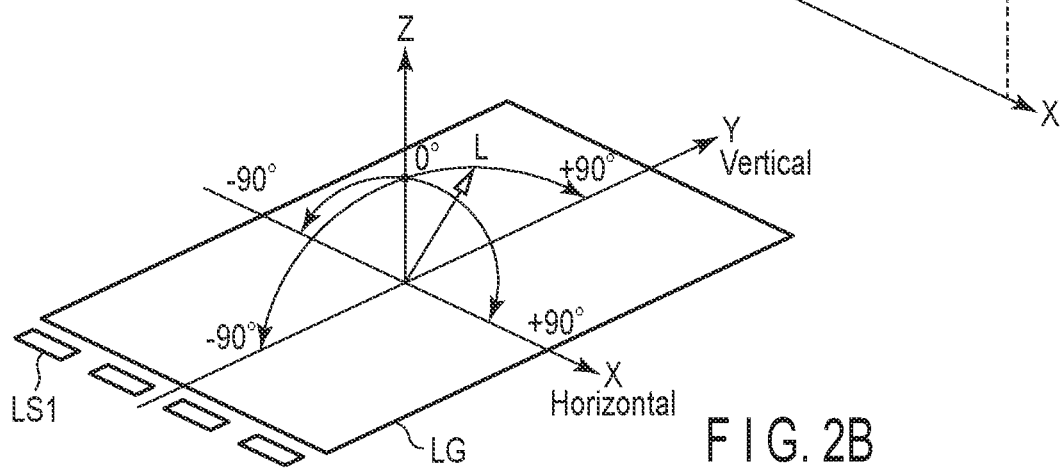
FIG. 2B is a perspective view of the structure of the light emitting device in a disassembled manner.

FIGS. 2A, 2B, and 2C illustrate the structure of the light emitting device. FIG. 2A is a perspective view of the structure of the light emitting device in a disassembled manner. As in FIG. 2A, the light guide plate LG includes a plurality of triangular prism shaped first protrusion parts TRVa (protrusion parts (convex portions) TRa) on the first main surface LGa. Each of the protrusion parts TRVa extend along the second direction Y. The protrusion parts TRVa are arranged along the first direction X which crosses the second direction Y. The cross-sectional shape of one protrusion part TRVa in the first direction X is an isosceles triangle, and the cross-sectional shape in the second direction Y is a rectangle. Specifically, the apex of the isosceles triangle is positioned above the base.

Furthermore, the light guide plate LG includes, on the second main surface LGb, a plurality of triangular prism shaped second protrusion parts TRVb (protrusion parts (convex portions) TRb). Each protrusion part TRVb extends along the first direction X. The protrusion parts TRVb are arranged along the second direction Y. The cross-sectional shape of one protrusion part TRVb in the second direction Y is an isosceles triangle, and the cross-sectional shape in the first direction X is a rectangle. Specifically, the apex of the isosceles triangle is positioned below the base.

Note that the direction in which the protrusion part TRVa extends (second direction Y) and the direction in which the protrusion part TRVb extends (first direction X) cross at an angle other than 90 degrees; however, they should be orthogonal to each other.

The light guide plate LG is, for example, formed of a transmissive resin material. The protrusion parts TRVa and TRVb are formed integrally with the light guide plate LG using, for example, a transmissive resin material. In other words, the main surface LGa of the light guide plate LG has a prism shape including a plurality of protrusion parts TRVa, and the main surface LGb of the light guide plate LG has a prism shape including a plurality of protrusion parts TRVb.

One protrusion part TRVa includes a ridge RDGa. Between ridges RDGa, valleys (valley portions) VLYa are disposed. The direction in which the ridge RDGa and the valley VLYa extend is the direction in which the protrusion part TRVa extends (second direction Y).

One protrusion part TRVb includes a ridge RDGb. Between ridges RDGb, valleys VLYb are disposed. The direction in which the ridge RDGb and the valley VLYb is the direction in which the protrusion TRVb extends (first direction X).

In other words, the light guide plate LG includes the main surface LGa with a plurality of protrusion parts TRVa with ridges RDGa extending in the second direction Y, and includes valleys VLYa between adjacent ridges RDGa. An inclined surface is arranged from the ridge RDa to the valley VLYa. The ridge RDGa, valley VLYa, and inclined surface shape an isosceles triangle in the first direction X.

Furthermore, the light guide plate LG includes the main surface LGb with a plurality of protrusion parts TRVb with ridges RDGb extending in the first direction X, and includes valleys VLYb between adjacent ridges RDGb. An inclined surface is arranged from the ridge RDb to the valley VLYb. The ridge RDGb, valley VLYb, and inclined surface shape an isosceles triangle in the second direction Y.

The prism sheet PRM is disposed above the light guide plate LG to be opposed to the light guide plate LG. The prism sheet PRM includes a main surface PRMb (third main surface) opposed to the light guide plate LG, and a main surface PRMa (fourth main surface) positioned in the opposite side of the main surface PRMb to emit light.

On the main surface PRMb, a plurality of triangular prism shaped third protrusion parts TRVp (protrusion parts (convex portions) TRVp) extending along the first direction X and arranged along the second direction Y. The cross-sectional shape of one protraction part TRVp in the second direction Y is an isosceles triangle, and the cross-sectional shape in the first direction X is a rectangle. Specifically, the apex of the isosceles triangle is positioned below the base of the isosceles triangle. The prism sheet PRM is a so-called reverse prism sheet.

The reflection sheet REF of FIG. 2A has a function to reflect the light leaked from the main surface LGb of the light guide plate LG to be returned in the light guide plate LG. Thus, light extraction efficiency can be improved. The reflection sheet REF has a mirror surface in the surface opposed to the light guide plate LG, and is formed of a sheet to which a metal such as silver is deposited, for example. Note that, the reflection sheet REF is not limited to a metal-deposited sheet, and may be a metal thin-films layered sheet, optical absorption sheet, or black sheet, for example.

FIGS. 2B and 2C illustrate an emission angle of emission light L. As in FIG. 2B, a hypothetical sphere is set in a space on the light guide plate LG in a latitudinal (horizontal) direction of the light guide plate LG (horizontal) and a longitudinal (vertical) direction of the light guide plate LG. In FIGS. 2B and 2C, an angle formed by the emission light L emitted from the light emitting device ILD and the third direction Z in the Y-Z plan is an emission angle $\varphi v$. Similarly, an angle formed by the emission light L and the third direction X in the X-Z plan is an emission angle $\varphi h$. The emission angle $\varphi v$ is between −90 degrees and 90 degrees, inclusive (−90 degrees≤$\varphi v$≤90 degrees) (in range of larger than and equal to −90 degrees, and smaller than and equal to 90 degrees), and the emission angle $\varphi h$ is between −90 degrees and 90 degrees, inclusive (−90 degrees≤$\varphi h$≤90 degrees) (in range of larger than and equal to −90 degrees, and smaller than and equal to 90 degrees. The ideal collimated light should satisfy $\varphi v$=$\varphi h$=0 degrees; however, the actual emission light L has an emission angle range, which will be described later.

FIGS. 3A and 3B illustrate cross-sectional shapes of the light guide plate LG. FIG. 3A is a cross-sectional view of the light guide plate LG, taken along line A1-A2 of FIG. 2A. FIG. 3B is a cross-sectional view of the light guide plate LG, taken along line B1-B2 of FIG. 2A.

In FIG. 3A, the cross-sectional shape of the protrusion part TRVa in the first direction X is an isosceles triangle apex of which is above the base. In FIG. 3A, the apex angle of the isosceles triangle which is the cross-sectional shape of the protrusion part TRVa is set as $\theta 1$. The apex angle $\theta 1$ is, preferably, between 55 degrees and 60 degrees, inclusive (the apex angle $\theta 1$ is in a range of larger than and equal to 55 degrees, and smaller than and equal to 65 degrees). The reason will be explained later.

In FIG. 3B, the cross-sectional shape of the protrusion part TRVb in the second direction Y is an isosceles triangle apex of which is below the base. In FIG. 3B, the apex angle of the isosceles triangle which is the cross-sectional shape of the protrusion part TRVb is set as $\theta 2$. The base angle $\theta 2$ is, preferably, between 1 degree and 3 degrees, inclusive (the base angle $\theta 2$ is in range of larger than and equal to 1 degree, and smaller than and equal to 3 degrees). The reason will be explained later.

Figure 4A:
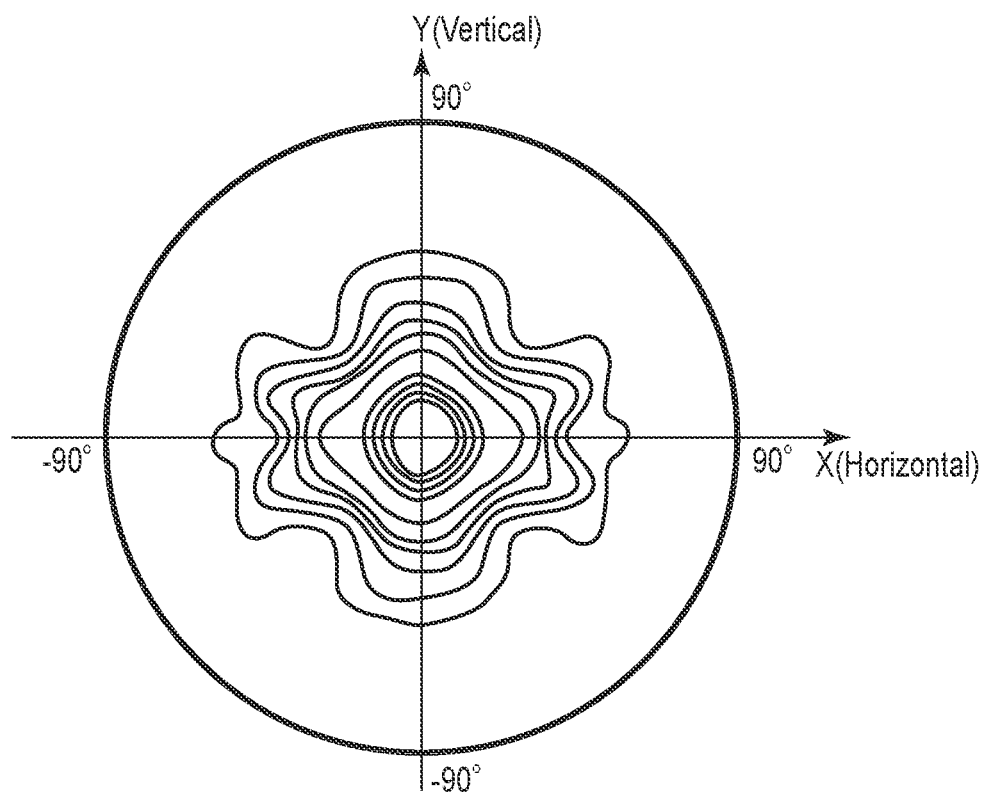
FIG. 4A illustrates emission angle distribution characteristics with respect to an apex angle $\theta 1$.
Figure 4B:
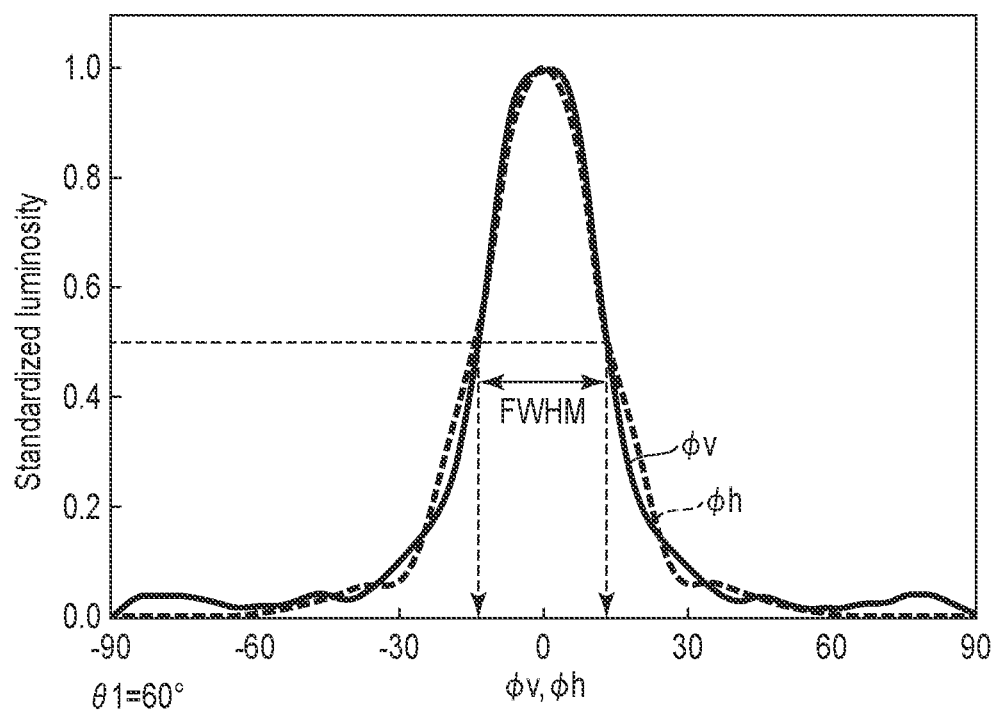
FIG. 4B illustrates emission angle distribution characteristics with respect to an apex angle $\theta 1$.

The reason why the apex angle $\theta 1$ is preferred to be between 55 degrees and 60 degrees will be explained here. FIGS. 4A, 4B, 5A, 5B, 6A, 6B, 7A, 7B, 8A, and 8B illustrate emission angle distribution characteristics with respect to the apex angle $\theta 1$. FIGS. 4A and 4B show a case where the apex angle $\theta 1$ of the protrusion part TRVa is 60 degrees, 5A and 5B show a case where the apex angle $\theta 1$ is 50 degrees, 6A and 6B show a case where the apex angle $\theta 1$ is 70 degrees, 7A and 7B show a case where the apex angle $\theta 1$ is 80 degrees, and 8A and 8B show a case where the apex angle $\theta 1$ is 100 degrees.

FIG. 4A shows an equi-luminosity curve (also called equi-luminance curve or equi-brightness curve) with respect to the emission angles $\varphi v$ and $\varphi h$ of the emission light L of the light emitting device ILD of FIGS. 2A to 2C. In FIG. 4A, the horizontal axis indicates the emission angle $\varphi h$, and the vertical axis indicates the emission angle $\varphi v$, and each line indicates a part of the equi-luminosity. FIG. 4B is a graph indicative of a relationship between the emission angles $\varphi v$ and $\varphi h$ and the luminosity (also called luminance or brightness) based on FIG. 4A. In FIG. 4B, the horizontal axis indicates the emission angles $\varphi v$ and $\varphi h$, and the vertical axis indicates the standardized luminosity in which the luminosity of the emission angles $\varphi v$ and $\varphi h$ is standardized. In FIG. 4B, the emission angle $\varphi v$ is plotted in a solid line, and the emission angle $\varphi h$ is plotted in a dotted line.

As in FIG. 4A, if the apex angle $\theta 1$ is 60 degrees, the distribution of luminosity is substantially the same in the emission angles $\varphi h$ (first direction X) and $\varphi v$ (second direction Y). That is, the emission light is irradiated evenly in both the first direction X and the second direction Y. The state where the light is evenly emitted in both the first direction X and the second direction Y can be estimated from the fact that the graphs of the emission angles $\varphi v$ and $\varphi h$ overlap with each other in many parts.

Figure 5A:
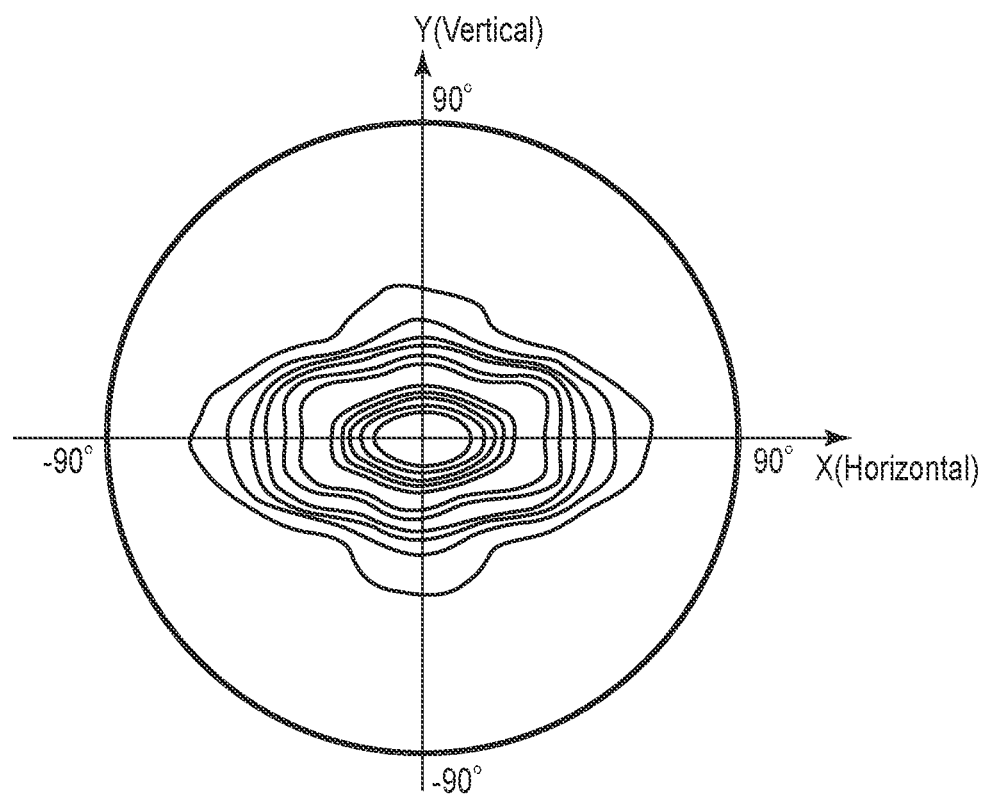
FIG. 5A illustrates emission angle distribution characteristics with respect to an apex angle $\theta 1$.
Figure 6A:
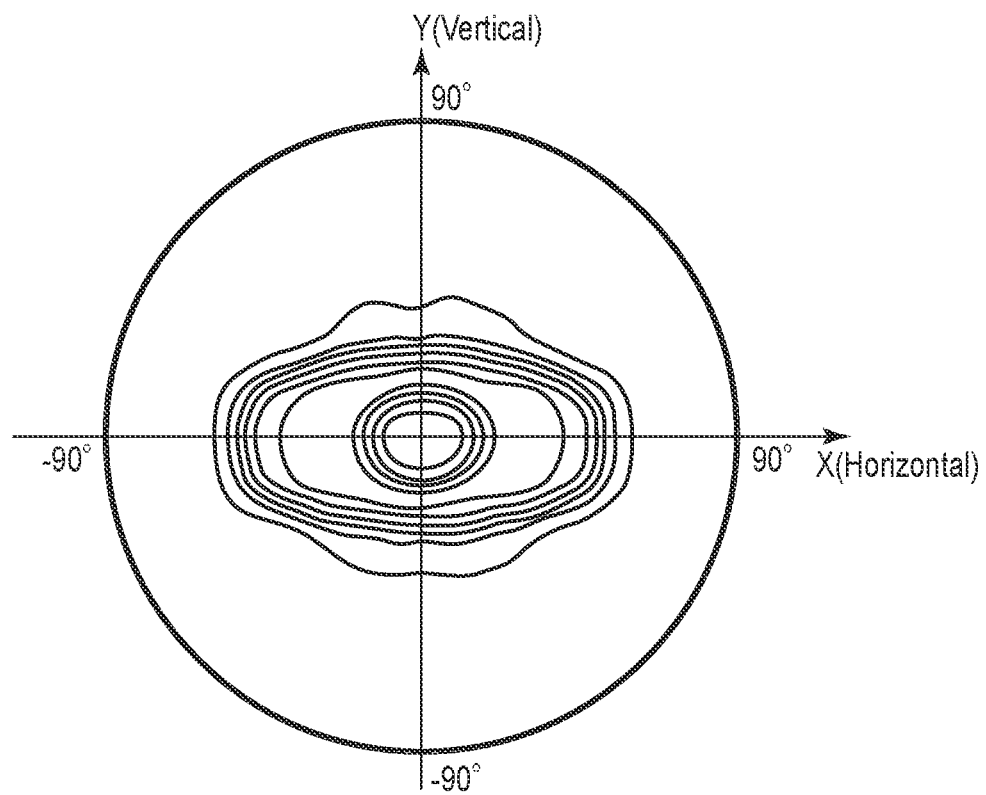
FIG. 6A illustrates emission angle distribution characteristics with respect to an apex angle $\theta 1$.
Figure 7A:
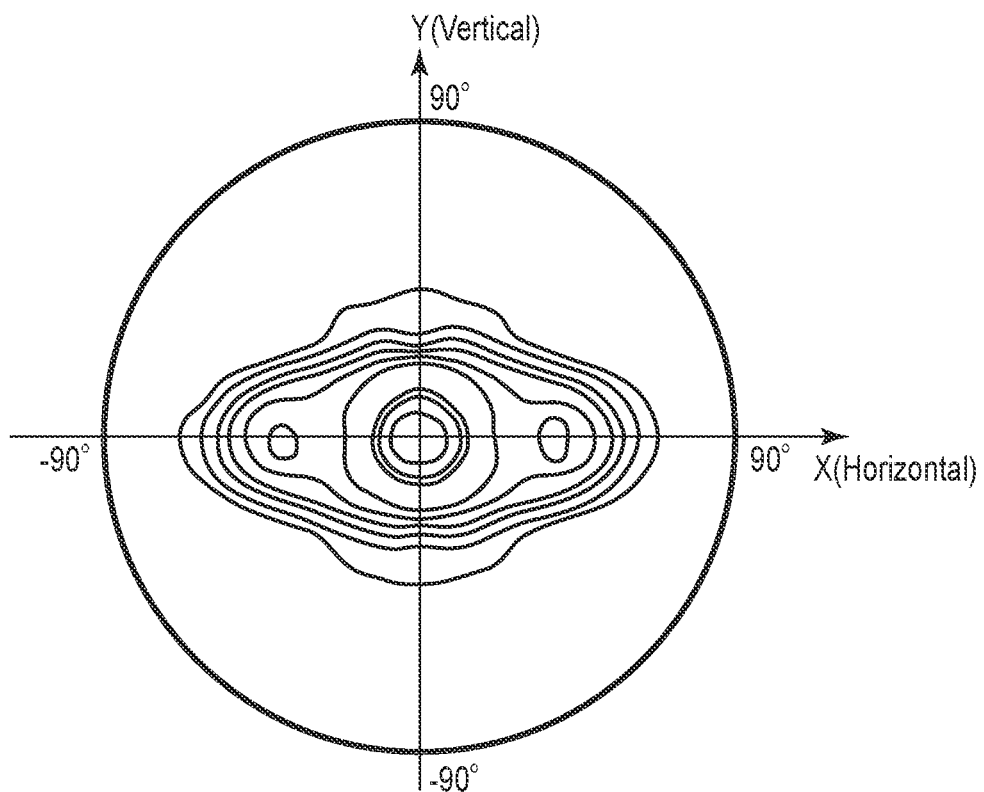
FIG. 7A illustrates emission angle distribution characteristics with respect to an apex angle $\theta 1$.
Figure 8A:
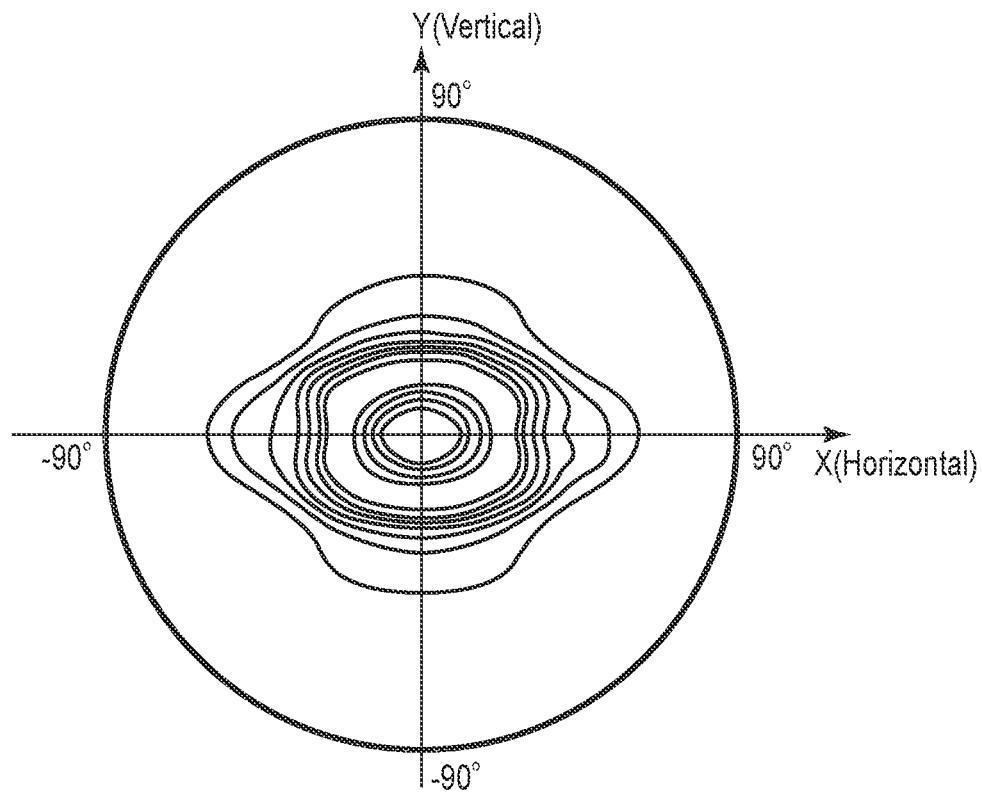
FIG. 8A illustrates emission angle distribution characteristics with respect to an apex angle $\theta 1$.

On the other hand, in FIG. 5A (apex angle $\theta 1$=50 degrees), FIG. 6A (apex angle $\theta 1$=70 degrees), FIG. 7A (apex angle $\theta 1$=80 degrees), and FIG. 8A (apex angle $\theta 1$=100 degrees), the equi-luminosity curve is widened in the emission angle φh (first direction X). That is, the light is irradiated unevenly in the first direction X and the second direction Y.

Figure 5B:
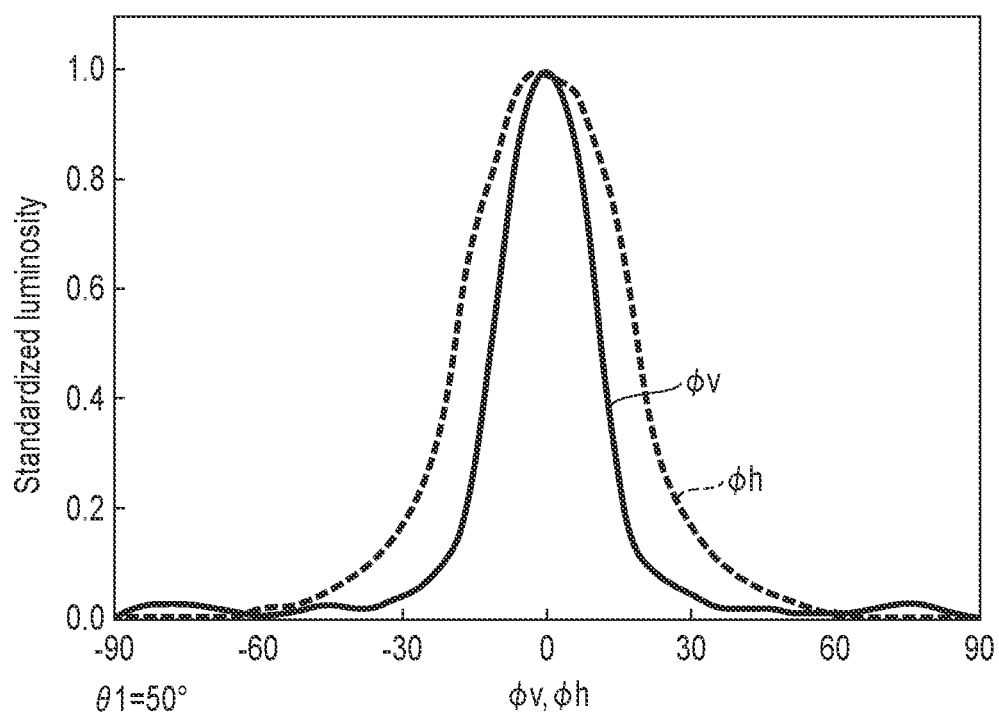
FIG. 5B illustrates emission angle distribution characteristics with respect to an apex angle $\theta 1$.
Figure 6B:
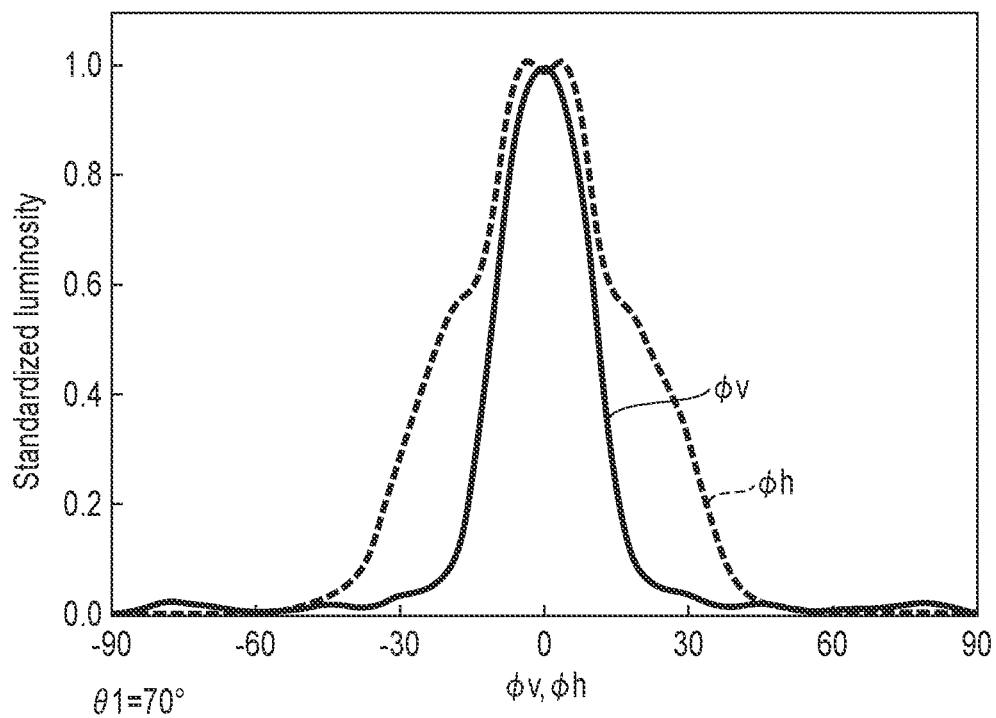
FIG. 6B illustrates emission angle distribution characteristics with respect to an apex angle $\theta 1$.
Figure 7B:
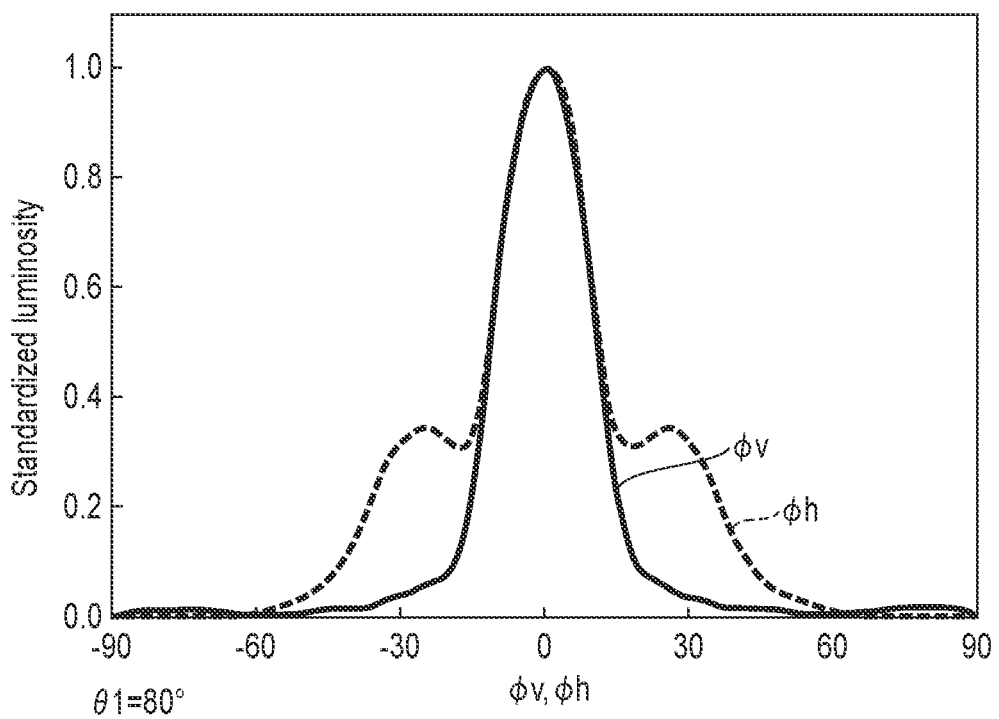
FIG. 7B illustrates emission angle distribution characteristics with respect to an apex angle $\theta 1$.
Figure 8B:
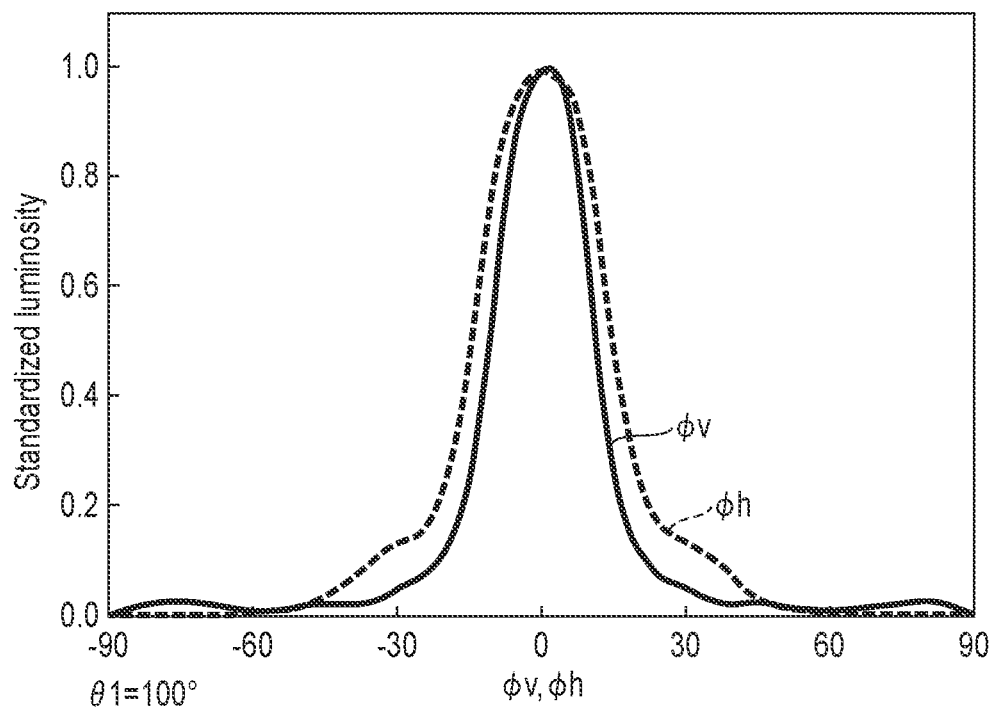
FIG. 8B illustrates emission angle distribution characteristics with respect to an apex angle $\theta 1$.

In FIG. 5B (apex angle θ1=50 degrees), FIG. 6B (apex angle θ1=70 degrees), FIG. 7B (apex angle θ1=80 degrees), and FIG. 8B (apex angle θ1=100 degrees), the graphs of the of the emission angles φv and φh overlap with each other in fewer parts. Thus, in cases where the apex angle θ1 is 50 degrees, 70 degrees, 80 degrees, and 100 degrees, the emission light is uneven in the first direction X and the second direction Y.

Using full width at half of the maximum (FWHM) of the graphs of FIGS. 4B, 5B, 6B, 7B, and 8B, calculation of a suitable range of the apex angle θ1 will be explained.

Referring to FIG. 4B, a case where the apex angle θ1 is 60 degrees will be explained. Full width at half of the maximum is derived from the graph of FIG. 4B, and with full width at half of the maximum, emission angle φv is −12 degrees and +12 degrees (in range of larger than and equal to −12 degrees, and smaller than and equal to 12 degrees), and emission angle φh is −12 degrees and +12 degrees (in range of larger than and equal to −12 degrees, and smaller than and equal to 12 degrees).

The emission light within the range of full width at half of the maximum of the graph of FIG. 4B, that is, the emission light of emission angle φv between −12 degrees and +12 degrees, inclusive (−12 degrees≤φv≤+12 degrees) and emission angle φh between −12 degrees and +12 degrees, inclusive (−12 degrees≤φh≤+12 degrees) is light which can be regarded as collimated light. Thus, the light emitting device ILD of the present embodiment should contain as much emission light with emission angles φv and φh within the above range as possible.

Figure 9:
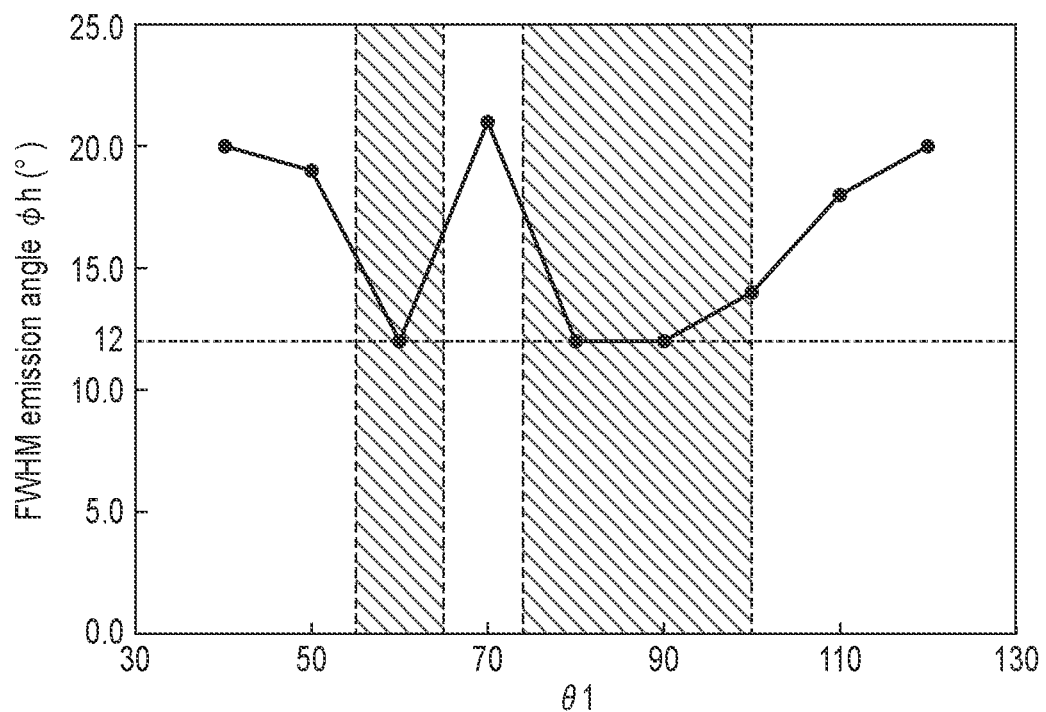
FIG. 9 illustrates a relationship between the apex angle $\theta 1$ and an emission angle $\varphi h$.

In a similar manner as in FIG. 4B, full width at half of the maximum of each of the emission angles φv and φh is derived with respect to in FIG. 5B (apex angle θ1=50 degrees), FIG. 6B (apex angle θ1=70 degrees), FIG. 7B (apex angle θ1=80 degrees), and FIG. 8B (apex angle θ1=100 degrees), and the emission angle φh at full width at half of the maximum is plotted as in FIG. 9.

Note that, the emission angle φv with full width at half of the maximum is −12 degrees and +12 degrees in each of FIGS. 4B, 5B, 6B, 7B, and 8B, and thus, the evaluation is performed with respect to the emission angle φh alone.

FIG. 9 illustrates a relationship between the emission angle φh and the apex angle θ1. In FIG. 9, the horizontal axis is apex angle θ1, and the vertical axis is a positive value of emission angle φh at full width at half of the maximum. The hatched area in FIG. 9 is a range of apex angle θ1 in a case where the positive value of emission angle φh at full width at half of the maximum is near 12 degrees. As in FIG. 9, the apex angle θ1 is, preferably, between 55 degrees and 65 degrees, inclusive, and between 75 degrees and 100 degrees, inclusive.

Now, noise in the present embodiment will be explained. In the present embodiment, noise is amount of light emitted at a shallow angle with respect to the X-Y plan. For example, in FIG. 8B (apex angle θ1=100 degrees), in the emission angles φv and φh, emission light can be recognized in the areas between 30 degrees and 90 degrees, inclusive, and between −90 degrees and −30 degrees, inclusive. Greater light emitted at a shallow angle (noise) means greater emission light widening horizontally. The light emitting device ILD emitting collimated light should have a lesser noise ratio.

Figure 10:
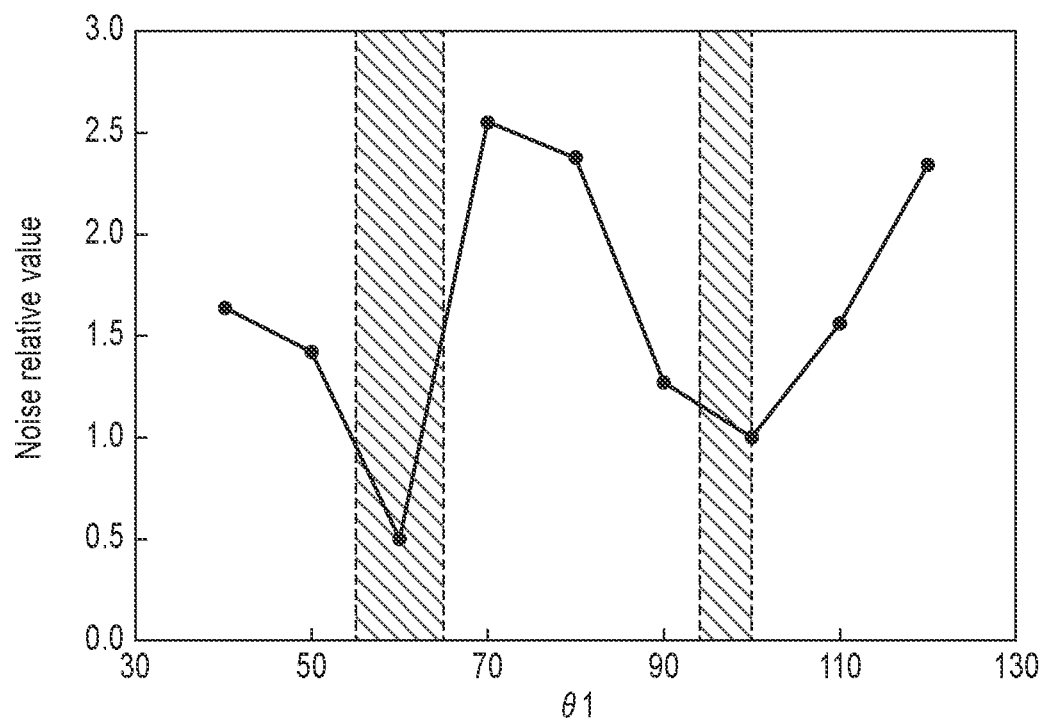
FIG. 10 illustrates a relationship between the apex angle $\theta 1$ and a noise relative value.

FIG. 10 illustrates a relationship between a noise relative value and the apex angle θ1. In FIG. 10, the horizontal axis is apex angle θ1 and the vertical axis is a noise relative value calculated as follows. That is, in FIG. 8B (apex angle θ1=100 degrees), the luminosity at emission angle φh is 30 degrees is set as 1. With respect to the luminosity, a relative value of luminosity at emission angle φh of 30 degrees in FIG. 4B (apex angle θ1=60 degrees), FIG. 5B (apex angle θ1=50 degrees), FIG. 6B (apex angle θ1=70 degrees), FIG. 7B (apex angle θ1=80 degrees), and FIG. 8B (apex angle θ1=100 degrees) is plotted as in FIG. 10.

The hatched area in FIG. 10 is a range of apex angle θ1 in a case where the above-mentioned noise relative value is the minimum value. As in FIG. 10, the apex angle θ1 is, preferably, between 55 degrees and 65 degrees, inclusive (in range of larger than and equal to 55 degrees, and smaller than and equal to 65 degrees, and between 95 degrees and 100 degrees, inclusive (in range of larger than and equal to 95 degrees, and smaller than and equal to 100 degrees).

Comparing the range between 55 degrees and 65 degrees, inclusive, and the range between 95 degrees and 100 degrees, inclusive, the range between 55 degrees and 65 degrees has smaller noise relative value than the range between 95 degrees and 100 degrees, inclusive.

From the above, it is clearly understood that apex angle θ1 between 55 degrees and 65 degrees is suitable for the protrusion part TRVa of the light guide plate LG of the light emitting device ILD.

Figure 11A:
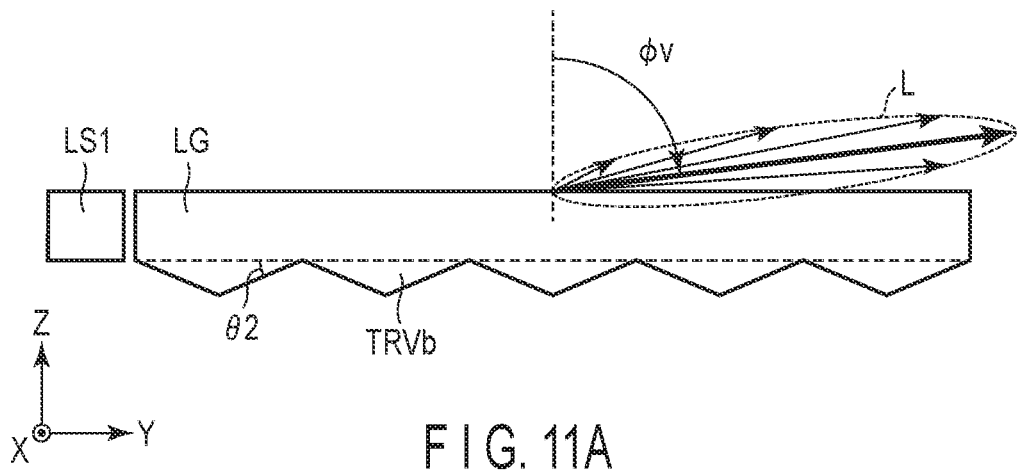
FIG. 11A illustrates a change in emission angle $\varphi v$ of emission light L based on the base angle $\theta 2$.
Figure 11B:
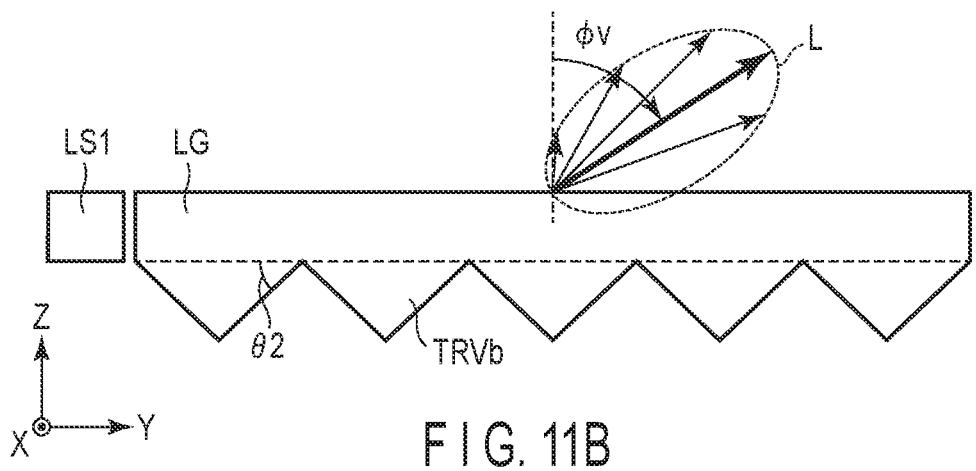
FIG. 11B illustrates a change in emission angle $\varphi v$ of emission light L based on the base angle $\theta 2$.
Figure 11C:
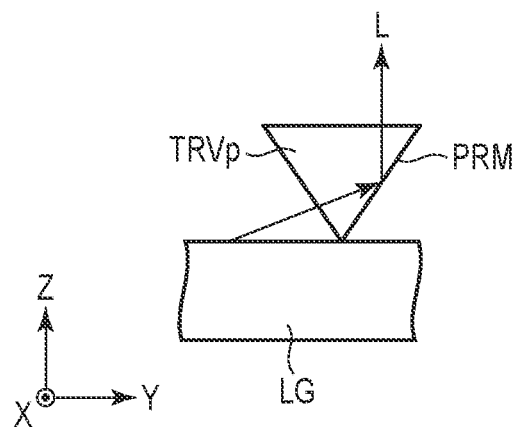
FIG. 11C illustrates a change in emission angle $\varphi v$ of emission light L based on the base angle $\theta 2$.

Now, the reason why base angle θ2 of the protrusion part TRVb is suitable in a range between 1 degree and 3 degrees, inclusive (in range of larger than and equal to 1 degree, and smaller than and equal to 3 degrees) will be explained. FIGS. 11A to 11C illustrate changes of emission angle φv of emission light L based on base angle θ2. FIG. 11A illustrates emission angle φv and distribution of emission light L in a case where base angle θ2 is small, and FIG. 11B illustrate those in a case where base angle θ2 is great.

As in FIG. 11A, if base angle θ2 is small, emission angle φv is great, and the emission angle distribution is narrow. In other words, emission light L is emitted with respect to the main surface LGa of the light guide plate LG at a shallow angle in a converged manner.

On the other hand, as in FIG. 11B, if base angle θ2 is great, emission angle φv is small, and the emission angle distribution is wide. In other words, emission light L is emitted with respect to the main surface LGa of the light guide plate LG at a deeper angle in a widened manner.

FIG. 11C is a schematic cross-sectional view illustrating the light guide plate LG, prism sheet PRM, and angle of emission light L. As in FIG. 11C, the emission light L emitted from the light guide plate LG is incident on the prism sheet PRM, reflected inside the protrusion part TRVp of the prism sheet PRM, and emitted above.

In order to obtain the above-mentioned collimated light, the emission light L emitted from the prism sheet PRM is desired to be emitted in a direction parallel to the third direction Z.

Here, the emission light L of FIG. 11A has a narrow emission angle distribution, and thus, the amount of light emitted above the prism sheet PRM becomes great. On the other hand, the emission light L of FIG. 11B has a wide emission angle distribution, and thus, the light emitted above from the surface of the prism sheet PRM is widely scattered at various angles. That is, the emission light to be taken to a direction parallel to the third direction Z may possibly be insufficient. Thus, the emission angle distribution of the emission light L desired to be narrow. In order to achieve the narrow emission angle distribution, smaller base angle θ2 of the protrusion part TRVb of the light guide plate LG is preferred. In the following description, this will further be explained.

Figure 12A:
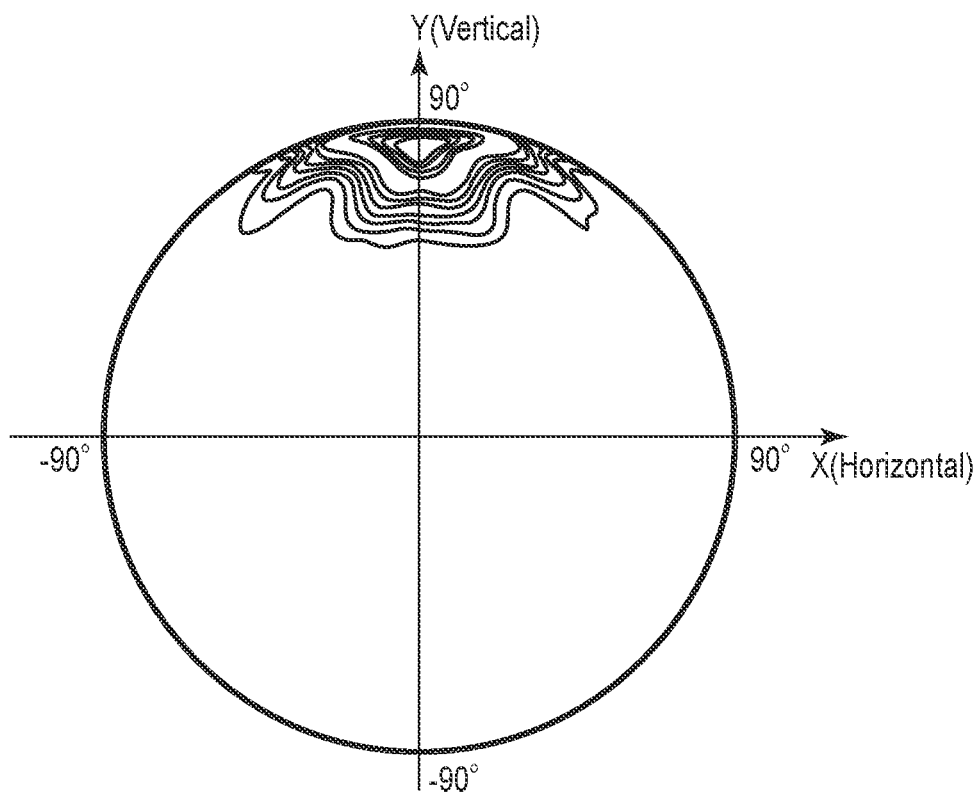
FIG. 12A illustrates emission angle distribution characteristics with respect to an apex angle $\theta 2$.
Figure 12B:
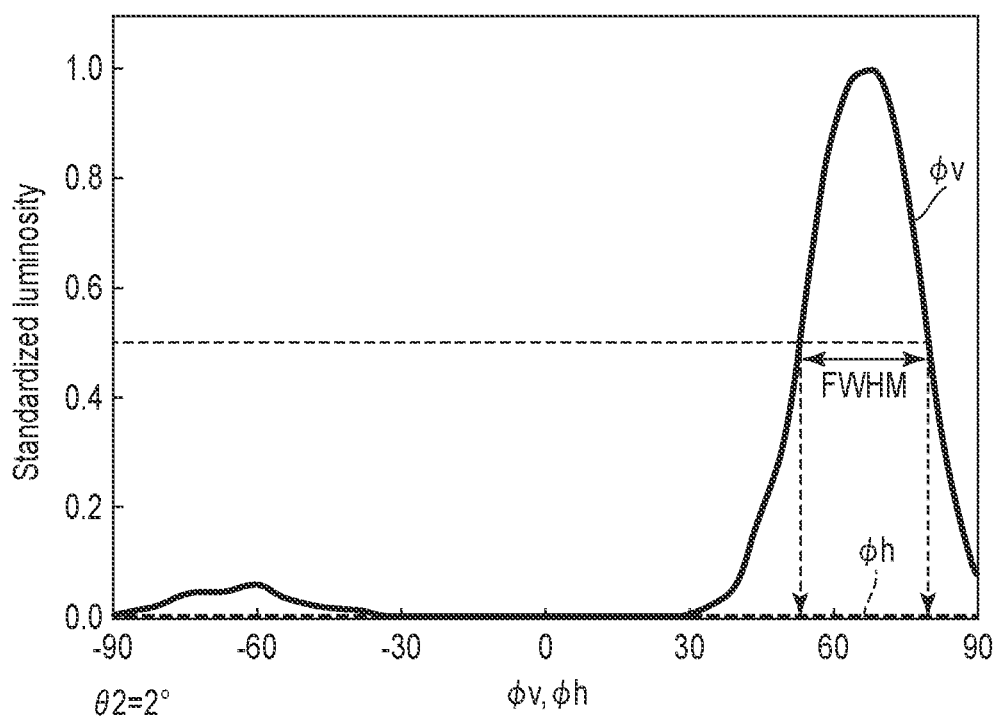
FIG. 12B illustrates emission angle distribution characteristics with respect to an apex angle $\theta 2$.
Figure 13A:
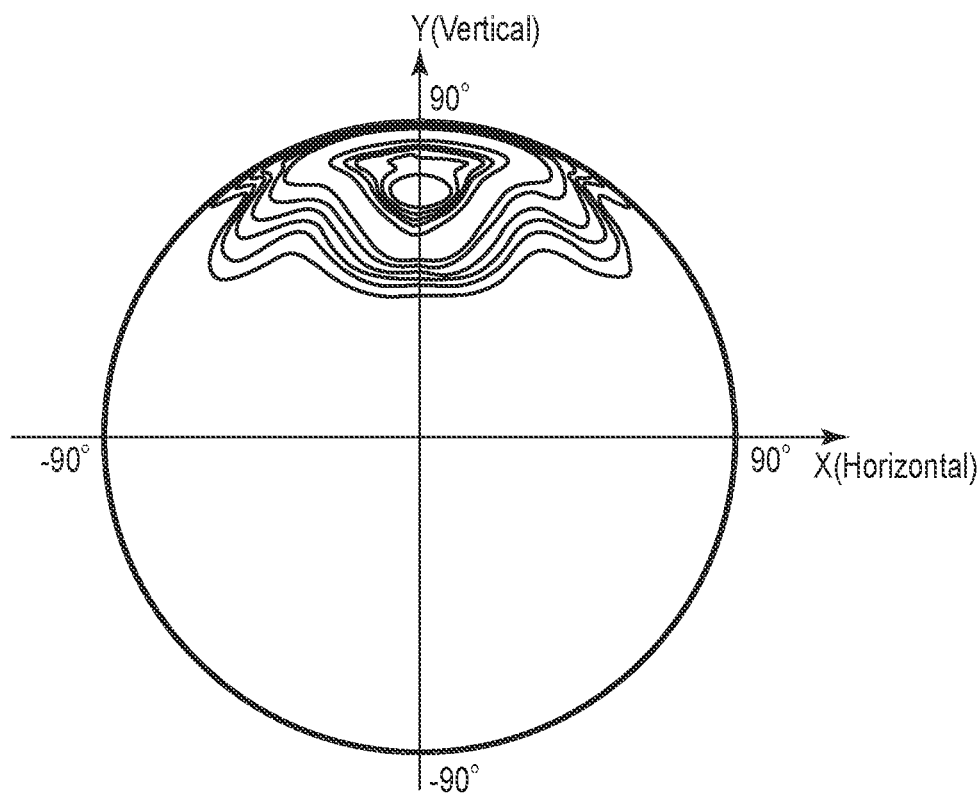
FIG. 13A illustrates emission angle distribution characteristics with respect to an apex angle $\theta 2$.
Figure 13B:
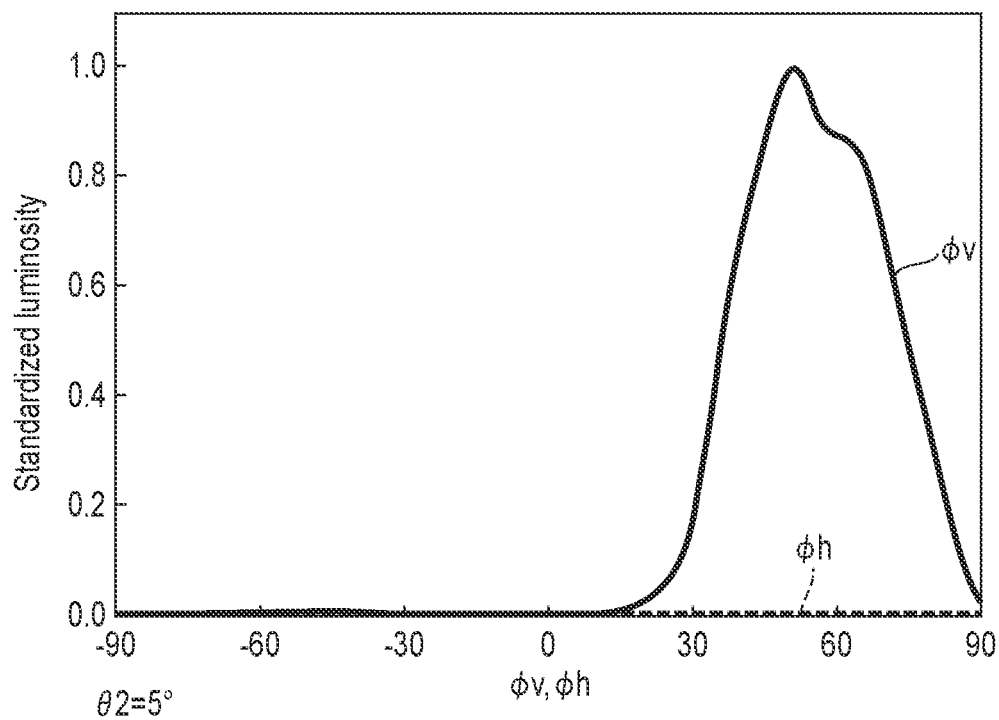
FIG. 13B illustrates emission angle distribution characteristics with respect to an apex angle $\theta 2$.

FIGS. 12A, 12B, 13A, and 13B illustrate emission angle distribution characteristics with respect to base angle θ2. FIGS. 12A and 12B illustrate a case where base angle θ2 of the protrusion part TRVb is 2 degrees, and FIGS. 13A and 13B illustrate a case where the base angle θ2 is 5 degrees.

FIGS. 12A and 13A each show an equi-luminosity curve with respect to the emission angles φv and φh as in FIG. 4A. In FIGS. 12A and 13A, the horizontal axis indicates the emission angle φh, and the vertical axis indicates the emission angle φv, and each line indicates a part of the equi-luminosity.

FIGS. 12B and 13B each illustrate a graph of a relationship between the emission angles φv and φh and the luminosity based on FIGS. 12A and 13A.

Full width at half of the maximum (FWHM) is derived from the graph of FIG. 12B, and a range of the emission angle φv at full width at half of the maximum (corresponding to emission angle distribution) is 24 degrees. Full width at half of the maximum (FWHM) is derived from the graph of FIG. 13B, and a range of the emission angle φv at full width at half of the maximum is 38 degrees.

That is, the emission angle distribution is narrower in the graph of FIG. 12B than the graph of FIG. 13B. Thus, base angle θ2 is better 2 degrees than 5 degrees.

Figure 14:
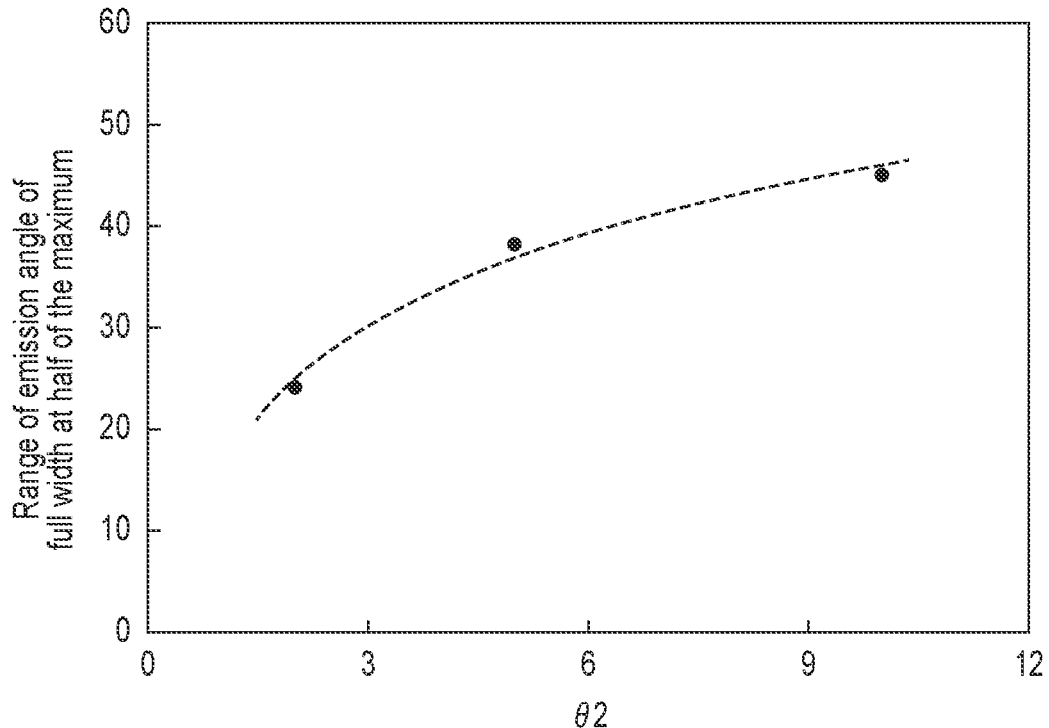
FIG. 14 illustrates a relationship between the base angle $\theta 2$ and an emission angle $\varphi v$.

Furthermore, evaluation of the emission angle distribution using full width at half of the maximum will be explained with reference to FIG. 14. FIG. 14 illustrates a relationship between emission angle φv and base angle θ2. In FIG. 14, the horizontal axis is base angle θ2 of protrusion part TRVb, and the vertical axis is a range of emission angle φv at full width at half of the maximum.

As in FIG. 14, when base angle θ2 increases, the range of emission angle φv increases accordingly. That is, if θ2 is small, the emission angle distribution is narrow. However, since base angle θ2 cannot be 0 degrees, the suitable range of base angle θ2 is 1 degree≤θ2≤3 degrees (angle θ2 is in a range of larger than and equal to 1 degree, and smaller than and equal to 3 degrees). If the base angle is below 1 degree, the efficiency of emission of light from the light guide plate LG is decreased, and especially, if the base angle is 0 degrees, light emission from the light guide plate LG cannot be performed.

From the above-described embodiment, it is clearly understood that base angle θ2 satisfying 1 degree≤θ2≤3 degrees is suitable in the protrusion part TRVb of the light guide plate LG of the light emitting device ILD.

The light emitting device ILD of the present embodiment can emit collimated light as described above. When a light collection device is laminated on the light emitting device ILD, an illumination device which can control the light emission direction can be achieved. Hereinafter, the illumination device of the present embodiment will be explained.

Figure 15:
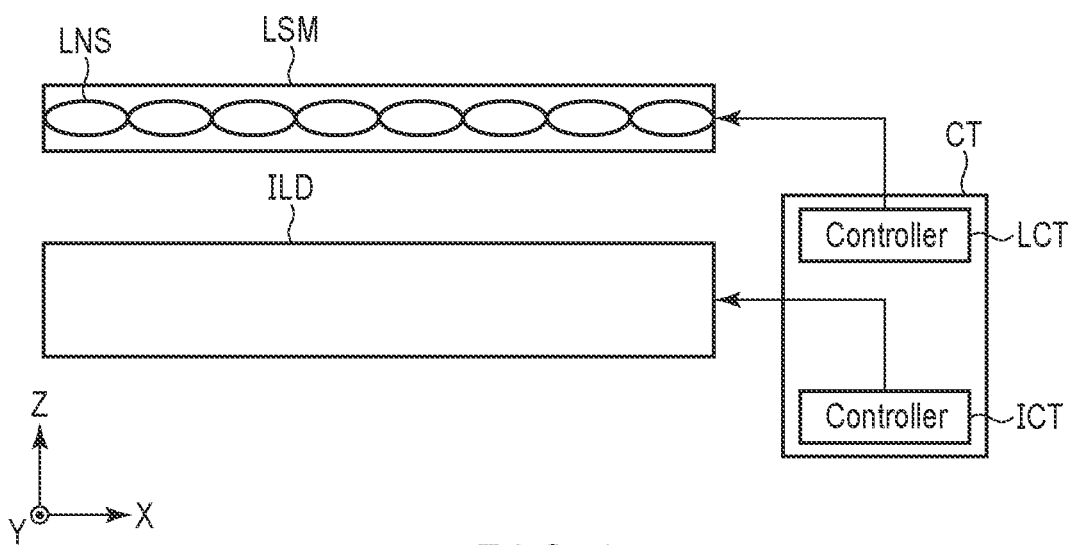
FIG. 15 illustrates an example of the structure of an illumination device.

FIG. 15 illustrates an example of the structure of an illumination device ILM. The illumination device ILM of FIG. 15 includes the above-described light emitting device ILD, and a light collection device LSM overlapping the light emitting device ILD in the third direction Z.

The illumination device ILM includes a controller CT. The controller CT includes controllers ICT and LCT. The controller ICT is to control the light emitting device ILD, and the controller LCT is to control the light collection device LSM. The controller ICT controls current to the light source element LS1 of, for example, FIG. 1. The controller LCT will be described later.

Figure 16:
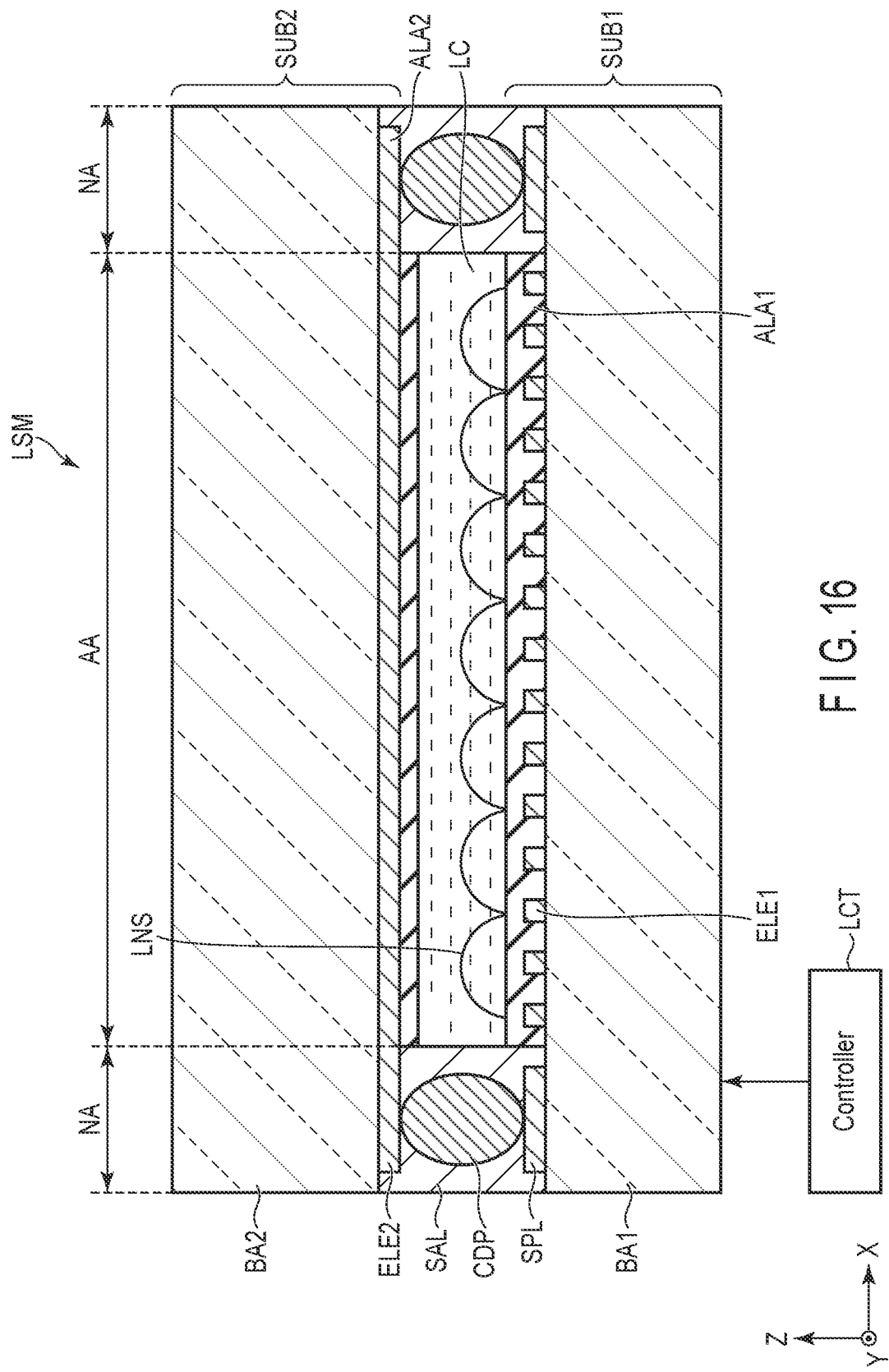
FIG. 16 is a schematic cross-sectional view of a light collection device.

FIG. 16 is a schematic cross-sectional view of the light collection device LSM. The light collection device LSM includes a first substrate SUB1, second substrate SUB2, liquid crystal layer LC with a plurality of liquid crystal molecules, first controller electrode ELE1, and second controller electrode ELE2. In the example depicted, the first controller electrode ELE1 is provided with the first substrate SUB1, and the second controller electrode ELE2 is provided with the second substrate SUB2. However, the first controller electrode ELE1 and the second controller electrode ELE2 may be disposed on the same substrate, that is, may be disposed on the first substrate SUB1 or the second substrate SUB2.

The first substrate SUB1 includes a transmissive base BA1, first controller electrode ELE1, alignment film ALA1, and power supplied line SPL. The first controller electrode ELE1 is disposed between the base BA1 and the liquid crystal layer LC. The first controller electrodes ELE1 are arranged in the first direction X at intervals. In this example, the width of the first controller electrode ELE1 in the first direction X is equal to or less than a gap between adjacent first controller electrodes ELE1 in the first direction X. The alignment film ALA1 covers the first controller electrode ELE1 and contacts the liquid crystal layer LC. The power supply line SPL is positioned in a non-active area NA which is outside of an active area AA.

The second substrate SUB2 includes a transmissive base BA2, second controller electrode ELE2, and alignment film ALA2. The second controller electrode ELE2 is disposed between the base BA2 and the liquid crystal layer LC. The second controller electrode ELE2 is a single flat-plate electrode disposed substantially in the entire surface of the active area AA and extending to the non-active area NA. The second controller electrode ELE2 is, in the active area AA, opposed to the first controller electrode ELE1 via the liquid crystal layer LC. The second controller electrode ELE2 is opposed to the power supply line SPL in the non-active area NA. The second controller electrode ELE2 is opposed to the power supply line SPL in the non-active area NA. The alignment film ALA2 covers the second controller electrode ELE2, and contacts the liquid crystal layer LC.

The bases BA1 and BA2 are, for example, a glass substrate or a resin substrate. The first controller electrode ELE1 and the second controller electrode ELE2 are formed of a transparent conductive material such as indium tin oxide (ITO) or indium zinc oxide (IZO). The alignment films ALA1 and ALA2 are, for example, a horizontal alignment film, and aligned in the first direction X.

The first substrate SUB1 and the second substrate SUB2 are adhered to each other in the non-active area NA with a sealant SAL. The sealant SAL includes conductive material CDP. The conductive material CDP is interposed between the power supply line SPL and the second controller electrode ELE2, to electrically connect the power supply line SPL and the second controller electrode ELE2.

The liquid crystal layer LC is held between the first substrate SUB1 and the second substrate SUB2. The liquid crystal layer LC is formed of, for example, liquid crystal material with positive dielectric anisotropy. The first controller electrode ELE1 and the second controller electrode ELE2 change the alignment direction of the liquid crystal molecules LCM in the liquid crystal layer LC by applying a voltage to the liquid crystal layer LC. When the alignment direction of the liquid crystal molecules LCM is changed, a liquid crystal lens LNS is formed in the liquid crystal layer LC.

The controller LCT controls the voltage to be applied to the liquid crystal layer LC. The controller LCT controls the voltage supplied to each of the first controller electrode ELE1 and the second controller electrode ELE2 in order to control a degree of the change of the alignment direction of the liquid crystal molecules LCM in the liquid crystal layer LC. Furthermore, the controller LCT controls the voltage supplied to each first controller electrode ELE1 in order to control a radius, focal length, formation position, and the like of the liquid crystal lens LNS.

Figure 17:
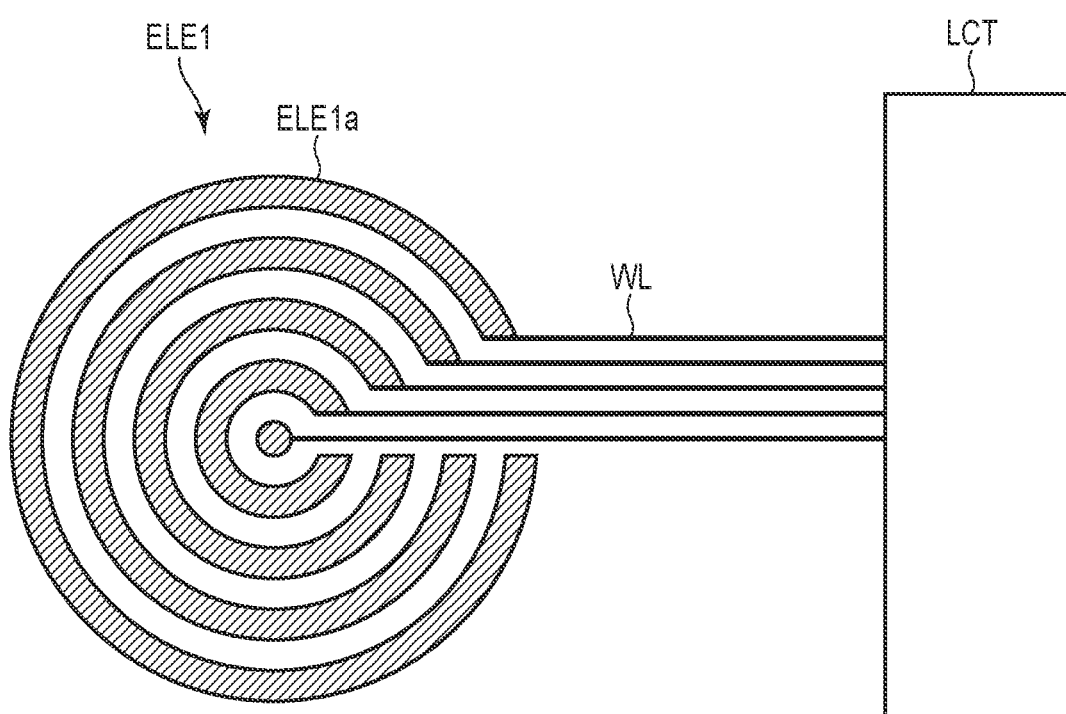
FIG. 17 is a plan view illustrating a shape of an electrode of the light collection device.

FIG. 17 is a plan view of a shape of the first controller electrode ELE1 of the light collection device LSM. The first controller electrode ELE1 of FIG. 17 includes multiple arcuate electrodes ELE1$a$ (only the center of which is circular) and draw electrodes WL. Each arcuate electrode ELE1$a$ is connected to the controller ICT through the draw electrode WL.

As described above, by changing the voltage supplied from the controller LCT to the first controller electrode ELE1, radius, focal distance, formation position, and the like of the liquid crystal lens LNS can be changed.

According to the present embodiment, a light emitting device which can emit collimated light, and an illumination device including the light emitting device can be obtained. The illumination device can emit light with directivity, and thus, emission direction can be specifically controlled.

Example

Figure 18A:
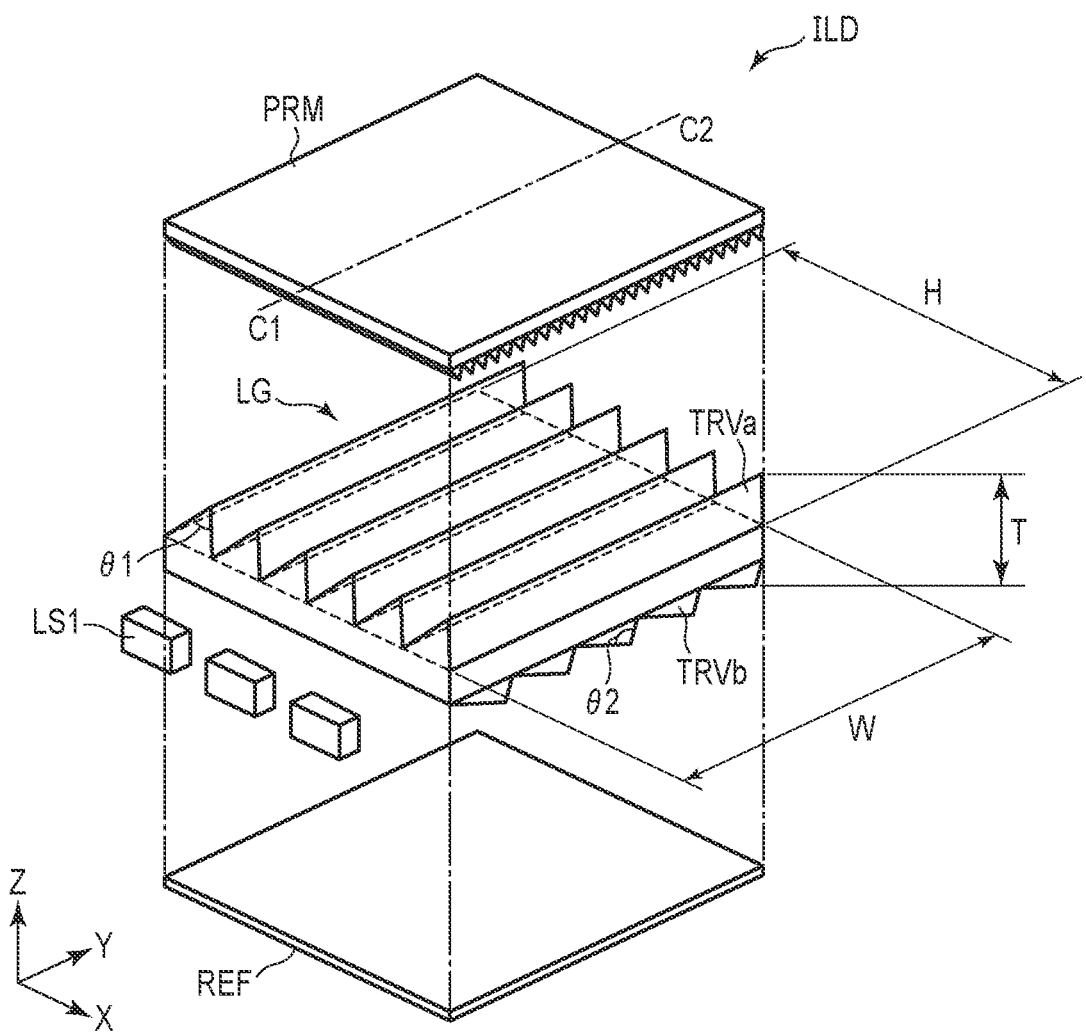
FIG. 18A illustrates a light emitting device of an example.
Figure 18B:
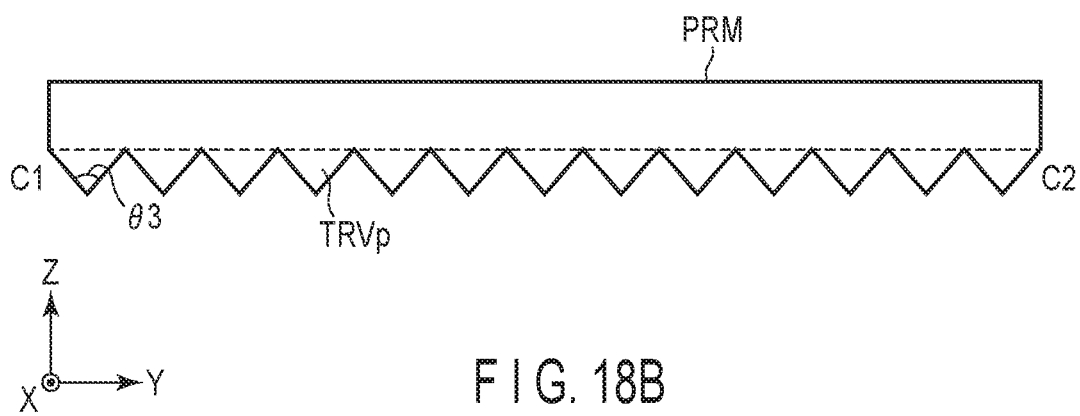
FIG. 18B illustrates the light emitting device of the example.

FIGS. 18A and 18B illustrate a light emitting device of the example. The light emitting device ILD of FIG. 18A is structured the same as that of FIG. 2A, and thus, detailed description of FIGS. 2A to 2C is applied here. In the light emitting device ILD of FIG. 18A, the light guide plate LG is formed of a polycarbonate material refractive index of which is 1.58. The light guide plate has a length W of 90 mm in the first direction X, length H of 90 mm in the second direction Y, and length (thickness) T of 2.0 mm in the third direction Z.

The protrusion part TRVa of the light guide plate LG has a triangular prism shape extending in the second direction Y. The cross-sectional shape of the protrusion part TRVa in the first direction X is an isosceles triangle with apex angle $\theta 1$ of 60 degrees.

The protrusion part TRVb of the light guide plate LG has a triangular prism shape extending in the first direction X. The cross-sectional shape of the protrusion part TRVb of the light guide plate LG in the second direction Y is an isosceles triangle with base angle $\theta 2$ of 2 degrees (apex angle of 176 degrees).

FIG. 18B is a cross-sectional view of the prism sheet PRM of FIG. 18A, taken along line C1-C2. The prism sheet PRM is formed of an acrylic material refractive index of which is 1.52. On the prism sheet PRM, as described above, triangular prism shaped protrusion parts TRVp extending in the first direction X are disposed. The cross-sectional shape of the protrusion part TRVp in the second direction Y is an isosceles triangle apex of which is positioned below the base. The apex angle of the isosceles triangle which is the cross-sectional shape of the protrusion part TRVp is an apex angle $\theta 3$. In FIGS. 18A and 18B, apex angle $\theta 3$ is 68 degrees.

The reflection sheet REF of FIG. 18A is formed of a silver deposited specular reflection material. The light source element LS1 is light emitting diode (LED).

The graph of the relationship between emission angles φv and φh and luminosity with respect to emission light from the light emitting device ILD of FIGS. 18A and 18B is shown in FIG. 4B. Since the description of FIG. 4B has been explained above, the detailed description thereof is not repeated here. In the present embodiment, the light emitting device which can emit collimated light can be achieved as above.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A light emitting device comprising:
a light guide plate having a first main surface, a second main surface, a first side surface, a second side surface opposite the first side surface, a third side surface adjacent to the first side surface and the second side surface, and a fourth side surface opposite the third side surface; and
a plurality of light source elements facing the first side surface of the light guide plate and arranging along a first direction, wherein
an emission surface of the light source element is disposed in a second direction which crosses the first direction,
the light guide plate has a plurality of upper protrusions on the first main surface and a plurality of protrusions on the second main surface,
the upper protrusions are arranged along the first direction and extended along the second direction,
a cross-sectional shape of the upper protrusions have an apex angle between 55 and 65 degrees, inclusive,
each of the plurality of protrusions is extended along the first direction and arranged along the second direction,
each of the plurality of protrusions has ridge extending from the third side surface to the fourth side surface,
a cross-sectional shape of each protrusions has a base angle between 1 and 3 degrees, inclusive, and
a prism sheet disposes to be opposed to the first main surface.

2. The light emitting device according to claim 1, wherein a reflection sheet disposes to be opposed to the second main surface of the light guide plate.

3. The light emitting device according to claim 2, wherein the prism sheet includes a plurality of protrusions on the surface opposed to the light guide plate, which extend along the first direction and are arranged in the second direction, and
each of the protrusions of the prism sheet has a cross-sectional shape along the second direction as an isosceles triangle in which an apex angle is positioned below the base.

4. The light emitting device according to claim 1, wherein the light source elements include first light source element and second light source elements,
the first light source elements is disposed on the first side surface, and the second light source elements is disposed on the second side surface.

5. An illumination device comprising:
the light emitting device according to claim 1; and a light collection device overlapping the light emitting device.

6. The illumination device according to claim 5, wherein the light collection device includes a liquid crystal layer in which a liquid crystal lens is formed.

\* \* \* \* \*